March 7, 1944.  J. W. BRYCE  2,343,399

MULTIPLYING MECHANISM FOR CHECKING DIVIDING COMPUTATIONS

Original Filed March 19, 1941   15 Sheets-Sheet 1

INVENTOR.
James W. Bryce
BY W. M. Wilson
ATTORNEY

March 7, 1944.  J. W. BRYCE  2,343,399

MULTIPLYING MECHANISM FOR CHECKING DIVIDING COMPUTATIONS

Original Filed March 19, 1941   15 Sheets-Sheet 2

| FIG.2a | FIG.2e |
| --- | --- |
| FIG.2b | FIG.2f |
| FIG.2c | FIG.2g |
| FIG.2d | FIG.2h |

INVENTOR.
James W. Bryce
BY W. M. Wilson
ATTORNEY

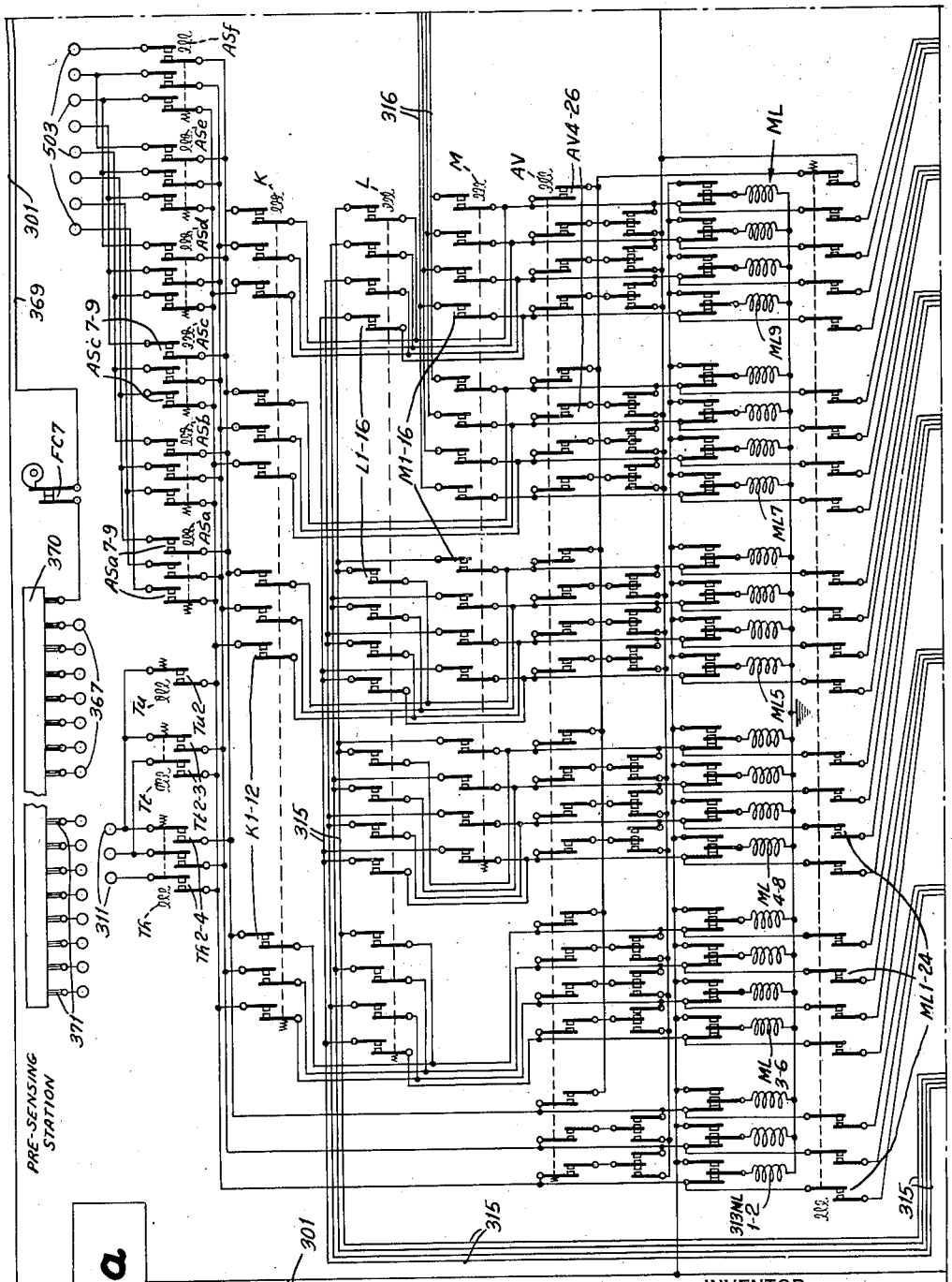

March 7, 1944. J. W. BRYCE 2,343,399
MULTIPLYING MECHANISM FOR CHECKING DIVIDING COMPUTATIONS
Original Filed March 19, 1941 15 Sheets-Sheet 5

INVENTOR
James W. Bryce
BY
W. M. Wilson
ATTORNEY

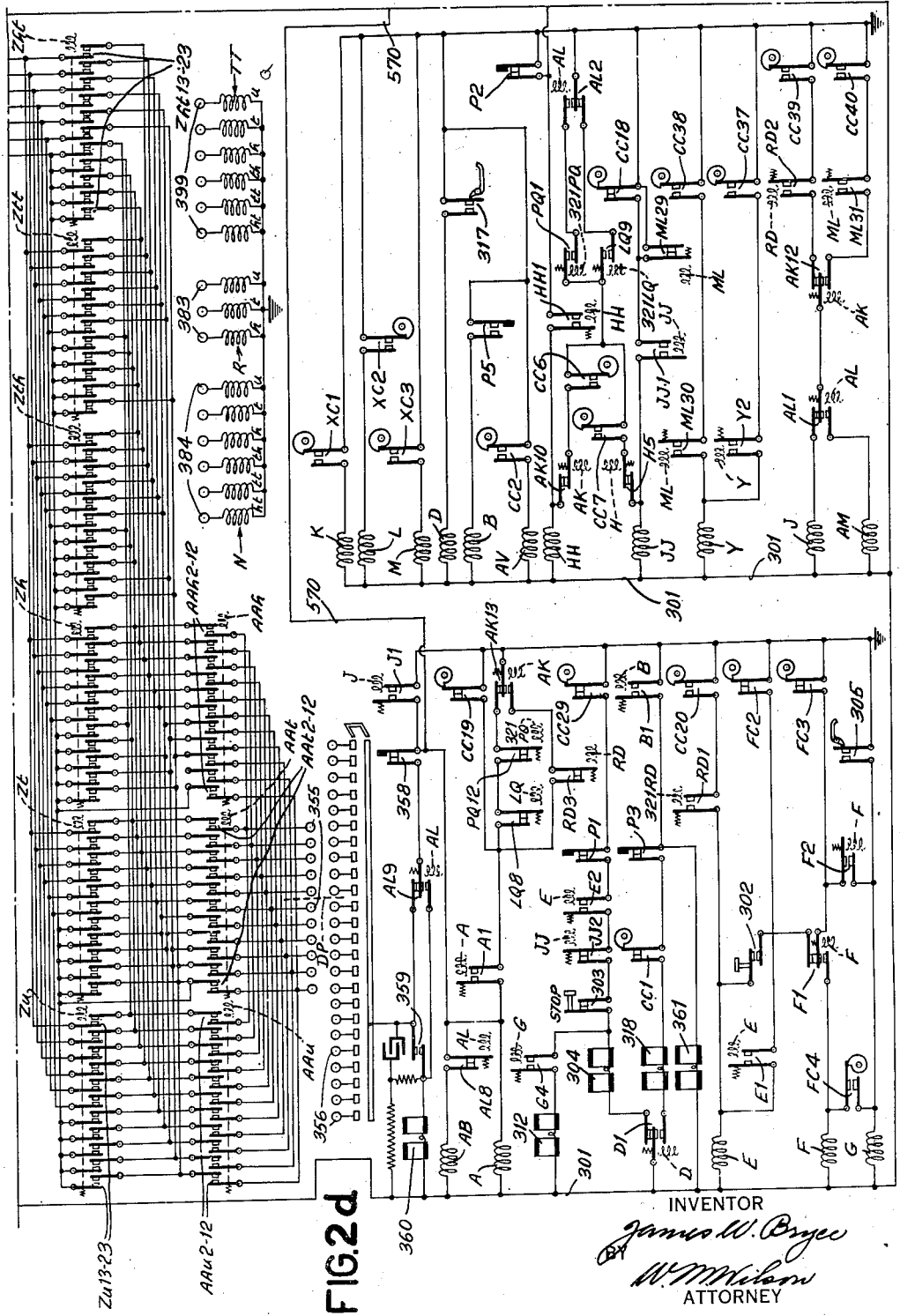

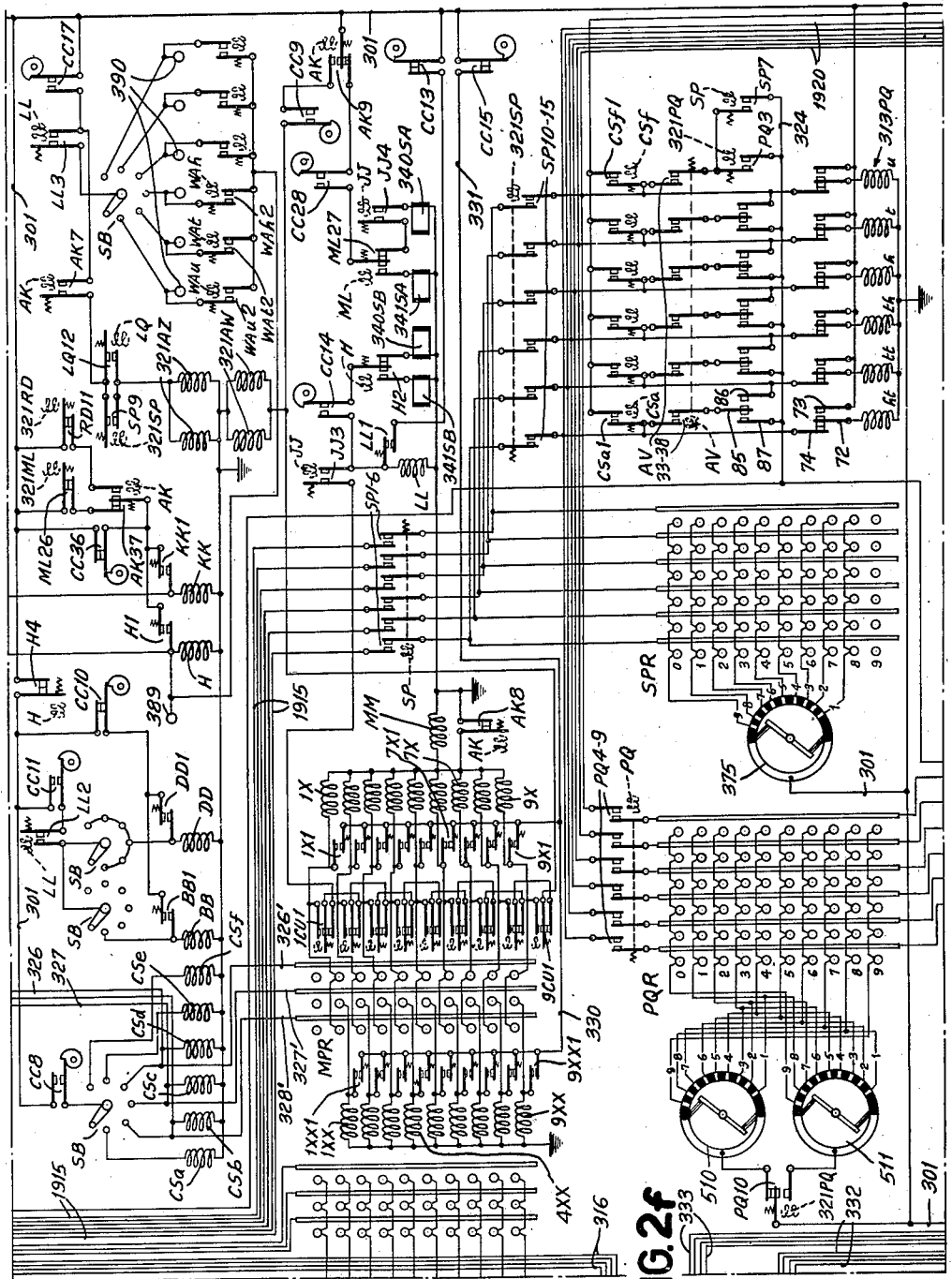

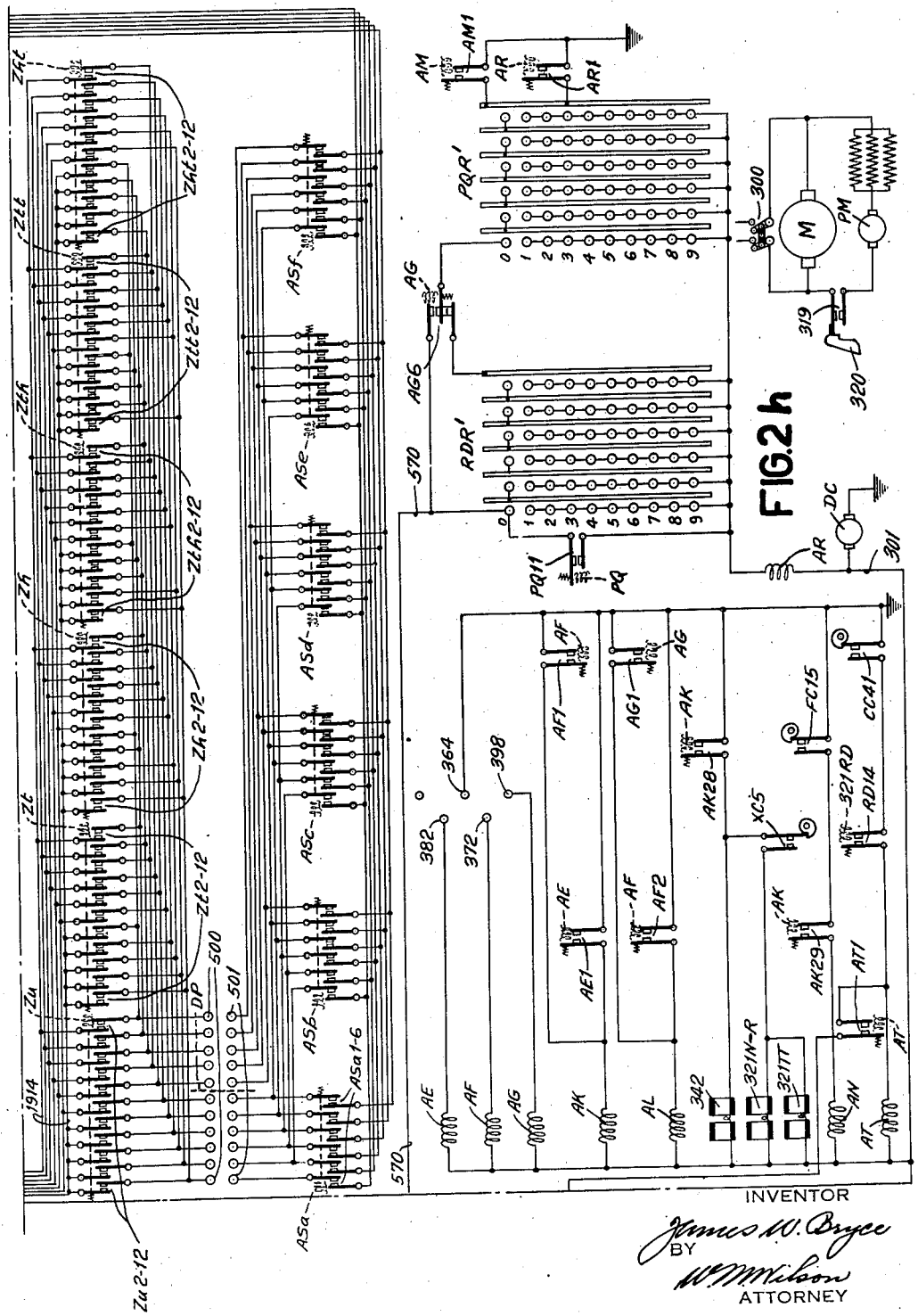

March 7, 1944. J. W. BRYCE 2,343,399
MULTIPLYING MECHANISM FOR CHECKING DIVIDING COMPUTATIONS
Original Filed March 19, 1941 15 Sheets-Sheet 11
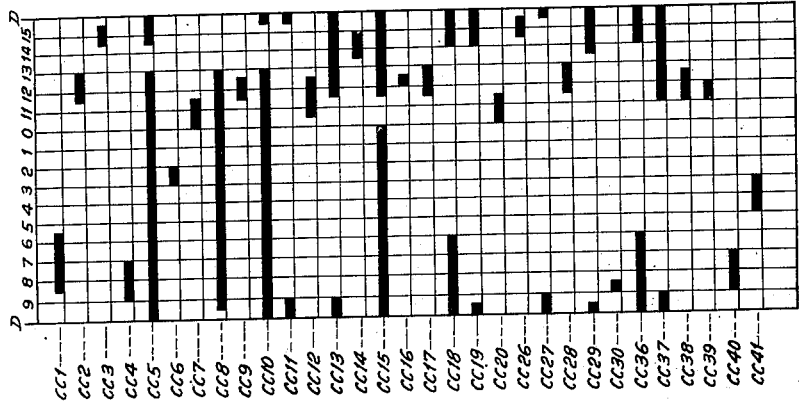
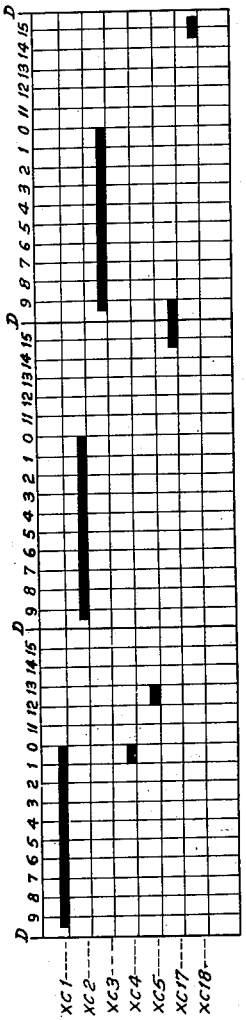
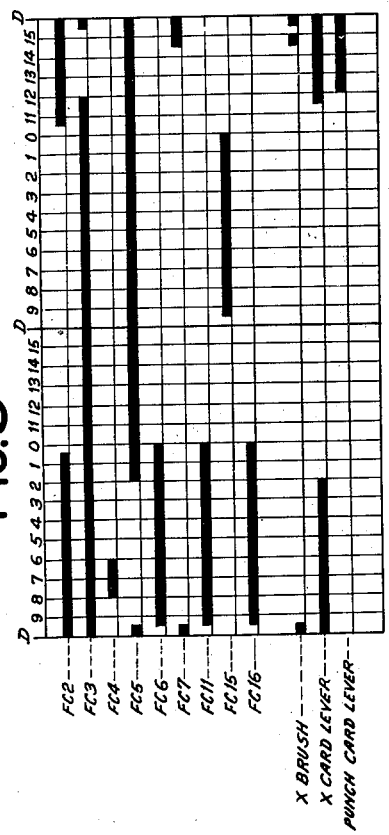
INVENTOR
James W. Bryce
BY
ATTORNEY March 7, 1944.    J. W. BRYCE    2,343,399
MULTIPLYING MECHANISM FOR CHECKING DIVIDING COMPUTATIONS
Original Filed March 19, 1941    15 Sheets-Sheet 12

INVENTOR
James W. Bryce
ATTORNEY

March 7, 1944.    J. W. BRYCE    2,343,399
MULTIPLYING MECHANISM FOR CHECKING DIVIDING COMPUTATIONS
Original Filed March 19, 1941    15 Sheets-Sheet 13

INVENTOR
James W. Bryce
BY
W. M. Wilson
ATTORNEY

March 7, 1944.     J. W. BRYCE     2,343,399
MULTIPLYING MECHANISM FOR CHECKING DIVIDING COMPUTATIONS
Original Filed March 19, 1941     15 Sheets-Sheet 14
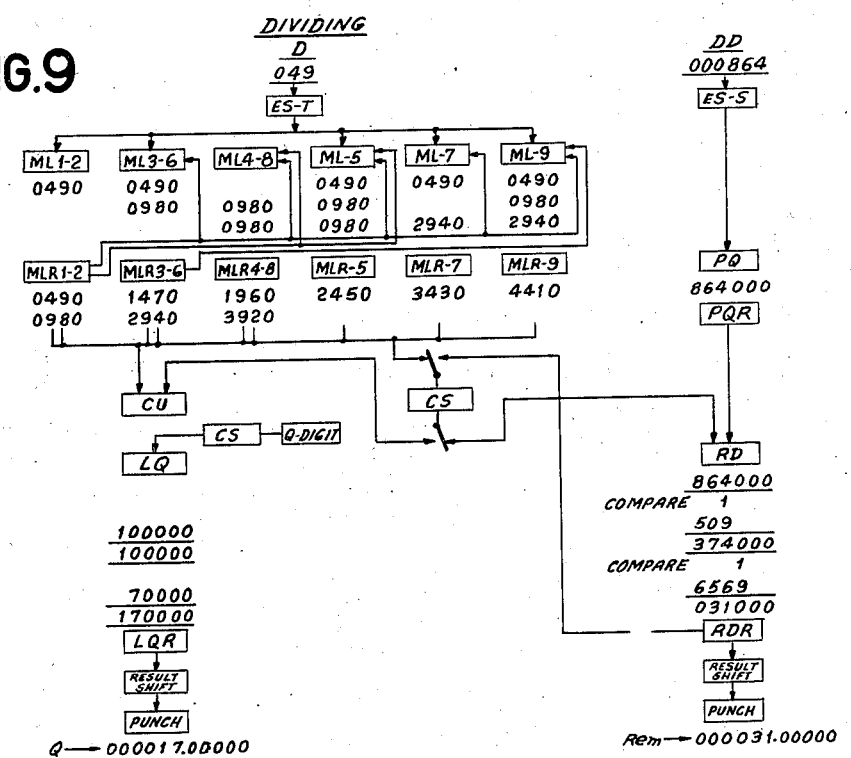
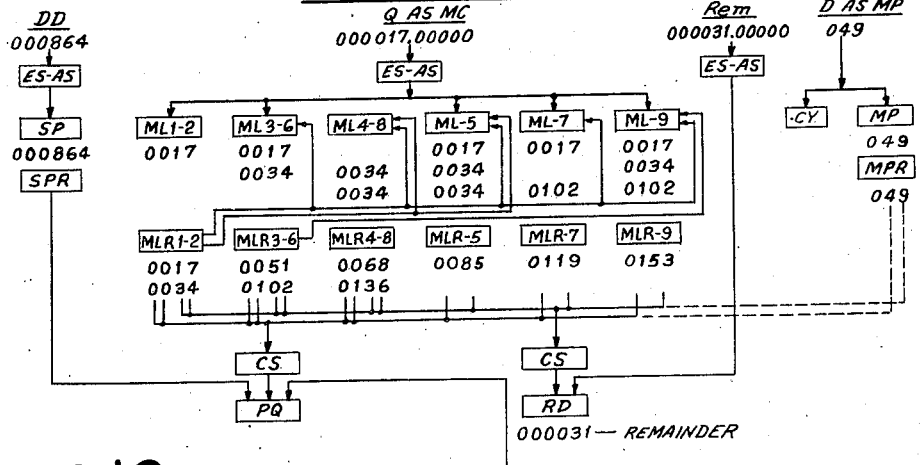
FIG. 9
FIG. 10
INVENTOR
James W. Bryce
BY
ATTORNEY March 7, 1944.  J. W. BRYCE  2,343,399
MULTIPLYING MECHANISM FOR CHECKING DIVIDING COMPUTATIONS
Original Filed March 19, 1941   15 Sheets-Sheet 15

INVENTOR
James W. Bryce
BY
ATTORNEY

Patented Mar. 7, 1944

2,343,399

UNITED STATES PATENT OFFICE 2,343,399

MULTIPLYING MECHANISM FOR CHECKING DIVIDING COMPUTATIONS

James W. Bryce, Glen Ridge, N. J., assignor to International Business Machines Corporation, New York, N. Y., a corporation of New York Original application March 19, 1941, Serial No. 384,157, now Patent No. 2,315,686, dated April 6, 1943. Divided and this application September 14, 1942, Serial No. 458,206

2 Claims. (Cl. 235—61.8)

This invention relates to improvements in a record controlled machine, particularly of the type which are adapted to perform either multiplying or dividing computations. The present improvements relate particularly to improvements in multiplying mechanisms for checking the results of a dividing computation.

This application is a division of application Serial No. 384,157, filed March 19, 1941, now Patent No. 2,315,686, dated April 6, 1943, and claims herein are restricted to the feature of checking the results of a previous dividing computation by a multiplying computation.

In accounting departments of some mercantile establishments multiplying computations are ordinarily desired but occasionally there is the necessity of carrying out an accounting procedure which involves dividing operations. There have been designed heretofore, and used commercially, multiplying machines which are controlled by records to carry out multiplying computations. Dividing machines have also been devised for carrying out record controlled dividing computations by the use of a separate dividing machine. The provision of a single machine whereby either dividing or multiplying operations may be carried out has heretofore been contemplated and by the utilization of certain apparatus which may be commonly used for both computations a desired simplification in the construction and operation of the machine may be secured. One embodiment of a machine of this type is fully shown and described in the application of J. W. Bryce et al., Serial No. 213,044, filed June 10, 1938.

Many users of record controlled computing machines insist that for certain classes of work the results of computations be checked and verified for accuracy. It is obvious, of course, that the accuracy of the results of a dividing operation may be effected by a recomputation of the same data. However, when this recomputation is performed by the same dividing mechanism, in the event that an error in the result is obtained by a faulty mechanism, the same error would be likely to occur in the recomputation. The checking operation is therefore not quickly recognized as also being an error and the present invention is primarily directed to improvements in multiplying checking mechanisms whereby the faulty or misoperation of one device would not be likely to occur in checking operations.

It is known mathematically that the factors and results of a dividing operation may be checked by going through a multiplying operation. The present improvements in checking mechanisms are based upon such known mathematics and since in checking operations some of the mechanisms not heretofore utilized for the primary computation are utilized, errors in checking are less likely to occur.

Accordingly, the present invention has for its main object the provision of a multiplying checking mechanism whereby the factors and quotient result and possible remainder of a dividing computation may be checked as to its mathematical relationship by the utilization of such values to control a multiplying operation.

A still further object of the present invention is to provide a very simple means whereby, by a single adjustment in the machine, the machine may be conditioned for checking a dividing computation by carrying out a multiplying computation.

When the machine is conditioned for the primary computation, that is, dividing, the machine performs such computation automatically in the same manner as the machine in the above mentioned Bryce application, Serial No. 213,044. After performing the multiplying checking computation, testing operations in the present machine then automatically ensue and upon locating an incorrectly computed record, a signal is given to the operator so that such records may be localized, thus enabling the errors to be ascertained by the operator.

A still further object of the present invention is to provide for the operation of the testing mechanism which determines whether the previous result is correct in such a manner that it will not increase the cycles of operation of the machine so that upon the completion of a multiplying computation carried out for checking previous results, the accuracy of such results will be obtained with no loss in time and with no extra machine cycles required for checking purposes.

As premised hereinbefore, dividing computations are preferably checked by multiplying the quotient and divisor factors and comparing the sum of the computed product and remainder result against the dividend. This object of the invention is carried out by the adoption of a simple testing mechanism by means of which the checking of the computation can be directly obtained immediately upon the completion of the multiplying computation. Preferably in carrying out checking of the factors and result of dividing computations by multiplication, the multiplying operations are carired out in the normal manner and the product result is entered in a checking accumulator which previously received the dividend value. Certain entry receiving devices are utilized to receive the remainder and by the addition of the remainder to the product amount in the checking accumulator and the subtraction of the dividend value, such accumulator should be restored to a zero status if the mathematical relationship between the values of the dividing computation is true and if the multiplying operation was correctly carried out.

The dividing machine shown herein and also in the Bryce application, Serial No. 213,044 above referred to is capable of taking into consideration the decimal point of the factors of division and accordingly the quotient and remainder result will be indicated on the record card with regard to the decimal point. In carrying out the checking of division by multiplying computations, the various values involved are denominationally entered in the accumulators with regard to their decimal point. This is necessary because the remainder might either be a whole number or a decimal and its entry in the checking accumulator must accordingly be shifted and entered in the proper denominational positions. This is also true of the dividend result which is entered in the checking accumulator as well as the quotient result which is preferably utilized as the multiplicand and in which multiples thereof are built up as a prerequisite to multiplying computations.

While the aforementioned checking mechanism has been shown in connection with the composite multiplying and dividing machine shown in the aforementional Bryce application, Serial No. 213,044, it is to be understood that such incorporation is merely illustrative and not restrictive. It is to be further understood that the present showings are merely the preferred embodiments of the invention and by obvious modifications the same objects may be carried out without, however, departing from the spirit of the invention.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 and Fig. 1a taken together with Fig. 1a to the right of Fig. 1 show a somewhat diagrammatic view of the various units of the machine and the drive therefor.

Figs. 2a to 2h inclusive taken together show the complete circuit diagram of the machine when arranged as shown in Fig. 3.

Fig. 4 is a cam timing diagram showing the timing of the various CC contacts.

Fig. 5 is a cam timing diagram of the FC cams.

Fig. 6 is a cam timing diagram of the XC cams.

Fig. 9 is a flow diagram of a typical dividing computation as performed by the machines.

Fig. 10 shows the flow diagram of the computation performed by the machine when a multiplying computation is carried out to check the results of a previous dividing computation.

Figure 11:
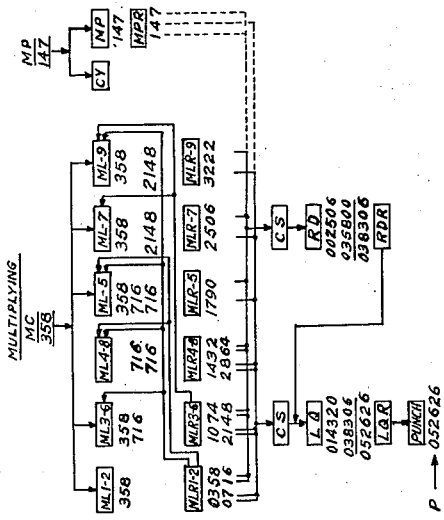
Fig. 11 is a flow diagram of a typical multiplying computation as performed by the machine.

The above Figs. 9, 10 and 11 are illustrative problems and show the manner of effecting entry into the various receiving devices and how the machine performs different typical computation. Each diagram is accompanied by a designating legend giving the particular calculation which is illustrated in the diagram.

Figure 12:
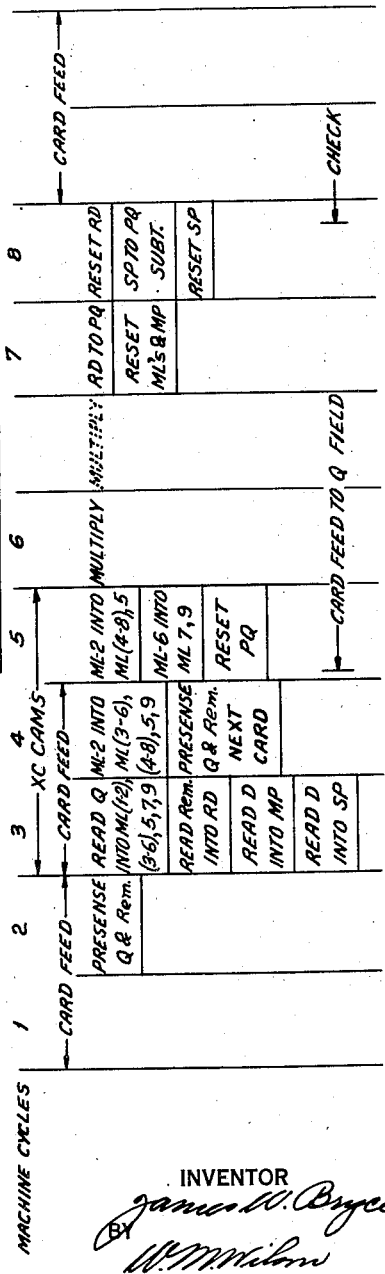

Fig. 12 is a sequence of operation diagram which shows the successive cycles of operation effected when a multiplying computation is utilized to check the results of a previous division computation.

Figure 13:
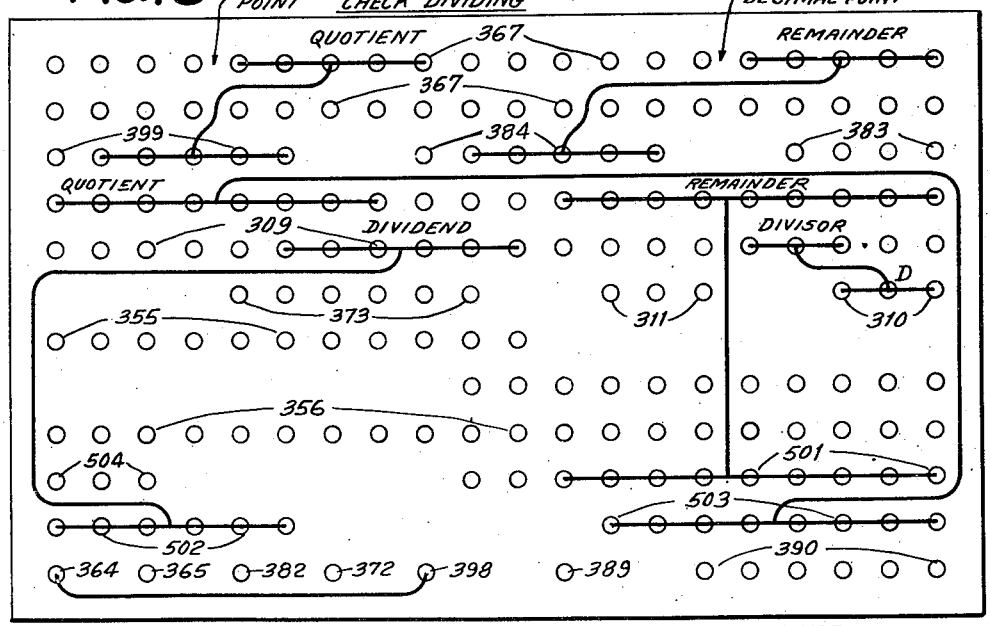

Fig. 13 shows the plugging of the insertible plugboard when the multiplying mechanism is utilized to check the results of a dividing computation.

Machine drive

Figure 1:
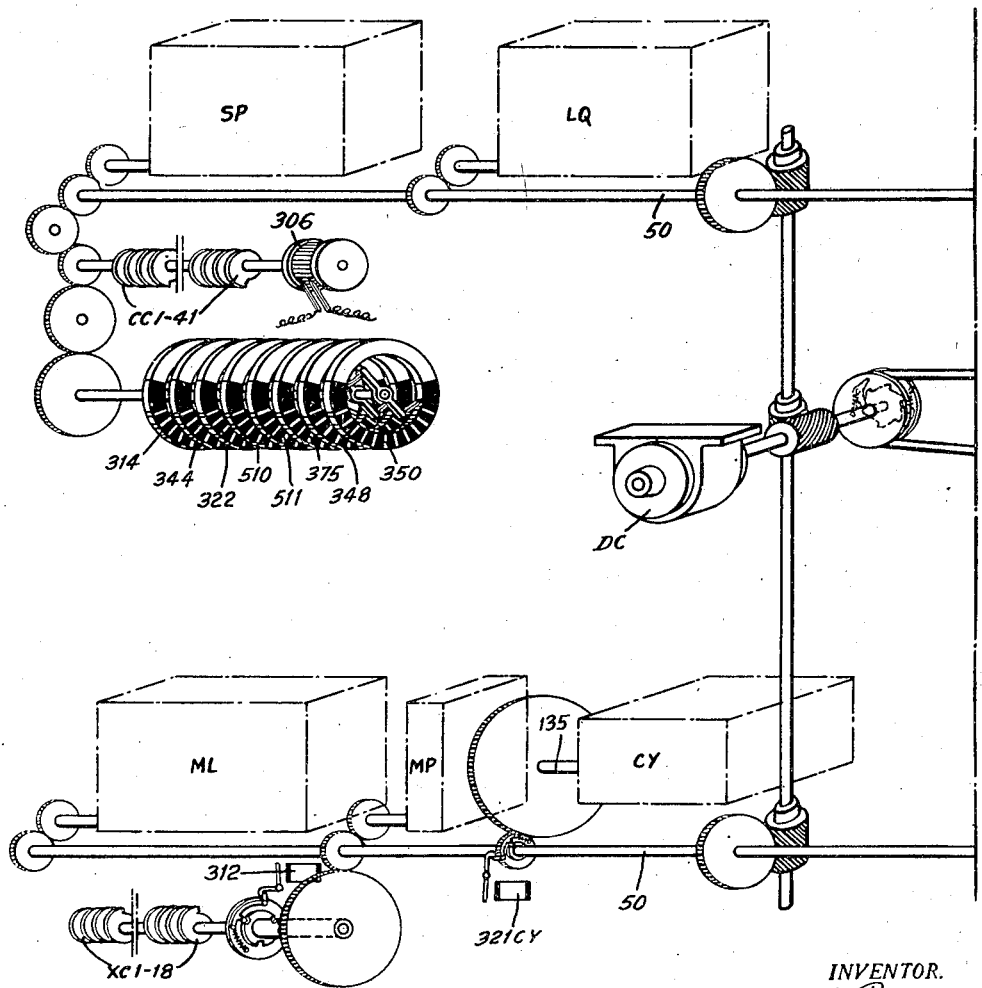
Figure 3:
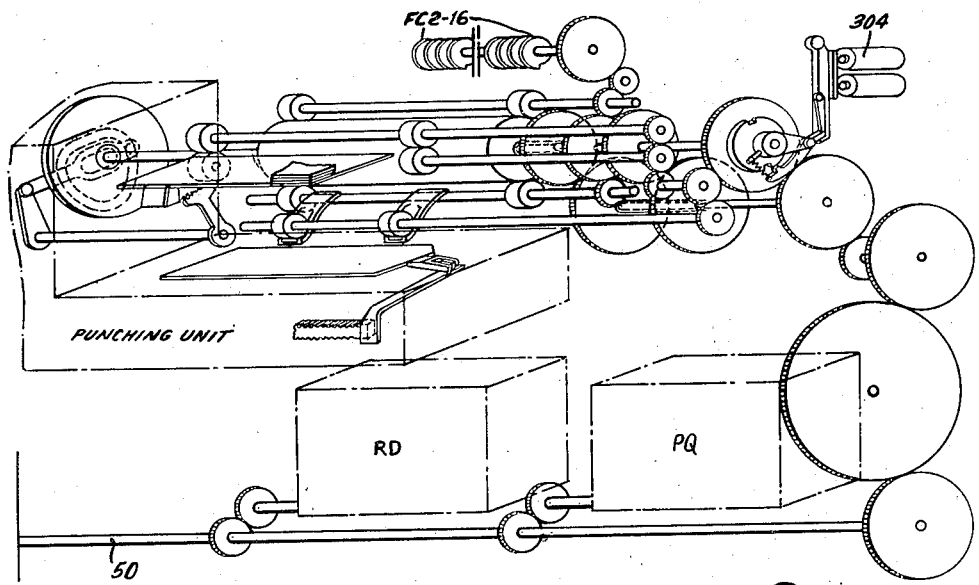
Fig. 3 shows the manner in which Figs. 2a to 2h should be coordinated.
Figure 1A:
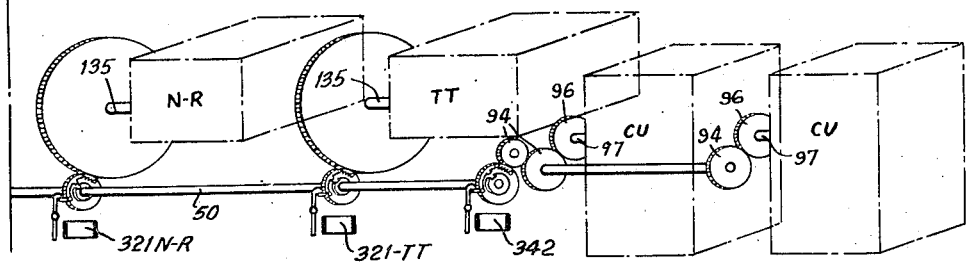

Referring first to Figs. 1 and 1a, in general the machine comprises six accumulating units which are respectively designated SP, LQ, RD, ML, MP, and PQ. It may be explained that the unit ML contains accumulators and readouts from which all of the nine digital multiples of the divisor or multiplicand can be derived depending upon whether the machine is used for division or multiplication. The MP receiving device receives the multiplier upon entry in the multiplying calculations. Such unit is not utilized in dividing. The accumulating units LQ and RD receive components of the products upon multiplication with the final product formed in LQ and upon division LQ receives the quotient amount and RD the dividend amount. When checking these calculations the PQ accumulator replaces the LQ in the above mentioned operations. The SP unit is utilized on checking computations. The various accumulating units are driven by the gearing delineated from the driving motor M. The machine is also provided with a direct current generator DC. The card handling and feeding section of the machine is of customary form like that shown in Daly Patent No. 2,045,437 and is driven in the usual manner. The FC cam contacts (FC2—16, Fig. 1a) are also driven in the customary manner in synchronism with the drive of the card handling section of the machine. The units designated CY, NR, and TT are electromechanical relay setup units of the general construction shown in Figs. 16 and 17 of Patent No. 2,315,686. Each of these units is adapted for reset from the constantly running drive shaft by the customary one revolution clutch arrangement. The reset magnets for the units are respectively designated 321CY, 321NR and 321TT. The comparing units are as shown diagrammatically at CUCU. These comparing units are of the forms shown in Figs. 12 to 15 inclusive of the Patent No. 2,315,686 and such units are adapted to be driven from the drive shaft by the use of the well known one-revolution clutch, the clutch magnet being designated 342. Also driven from the main drive shaft are the usual CC cams designated CC1—41 and the impulse distributor 306. In addition there are also provided eight impulse emitters which are designated 314, 344, 322, 510, 511, 375, 348, and 359. Referring now to the XC1—18 cam contacts, such cam contacts are driven from the drive shaft through a one-revolution clutch which is controlled by magnet 312. The drive side of the one-revolution clutch receives its drive from the main drive shaft through the gearing shown which drives the XC cams one revolution for each three revolutions of the main drive shaft.

For clarity and subsequent description, the upper and lower drive shafts will be given a like reference numeral 50.

Accumulators and entry receiving devices

As stated, the SP, LQ, RD, ML and MP units are accumulators of electromechanical type. These accumulators are identical in construction except for the number of readout sections, some accumulators having four readout sections and others having two. The accumulator which is here employed may be of various types known in the art, more particularly the type of accumulator having electrical transfer and electrical reset. Suitable accumulators of this type are shown and described in United States Patent No. 1,834,767 and suitable readout structure may be that shown in United States Patent No. 2,062,117 employing the electric reset of Patent No. 1,834,767, modified as per British Patent No. 422,135.

The present invention involves transfer total arrangements according to British Patent No. 422,135.

While the aforesaid accumulators are of suitable type for use with the present invention, preferably a preferred accumulator is of the form illustrated and described in the Lake and Pfaff Patent No. 2,232,006, dated February 18, 1941, and more fully shown in the parent Patent No. 2,315,686.

Insertible plugboards

In order to quickly shift the machine controls from one status in which it is capable of effecting one type of computation to another status for effecting another type of computation use is made of insertible plugboard elements. This insertible plugboard construction is of a type known in the art and the insertible plug unit is generally indicated at 141 in Fig. 18 of Patent No. 2,315,686. Devices of this type are generally known as "automatic plugboards" and a suitable form of such board is shown and fully described in the patent to C. D. Lake, No. 2,111,118. Such automatic plugboard arrangement comprises a series of relative fixed machine sockets to which the fixed machine wiring is connected. Adapted for co-operation with such sockets are plug prongs carried by a replaceable plugboard assembly or unit. Such plug prongs on the replaceable board are in turn connected to plug sockets upon the replaceable board. These plugboard sockets may be in turn plugged up by the operator selectively at will or the entire board may be pre-plugged with a desired set of connections.

Figure 7:
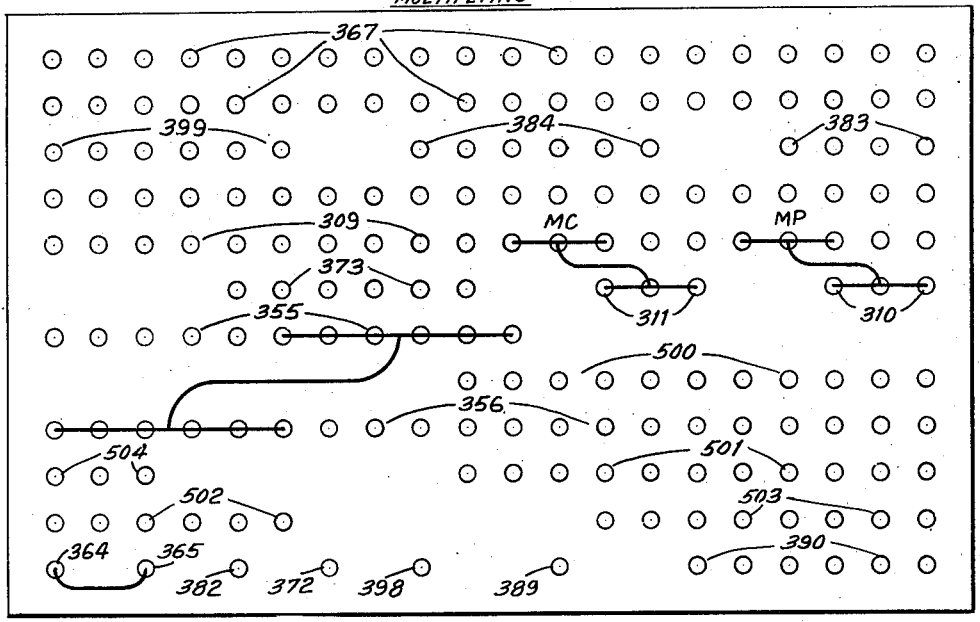
Fig. 7 shows the plugging of the insertible plug-board for effecting a simple multiplying calculation.
Figure 8:
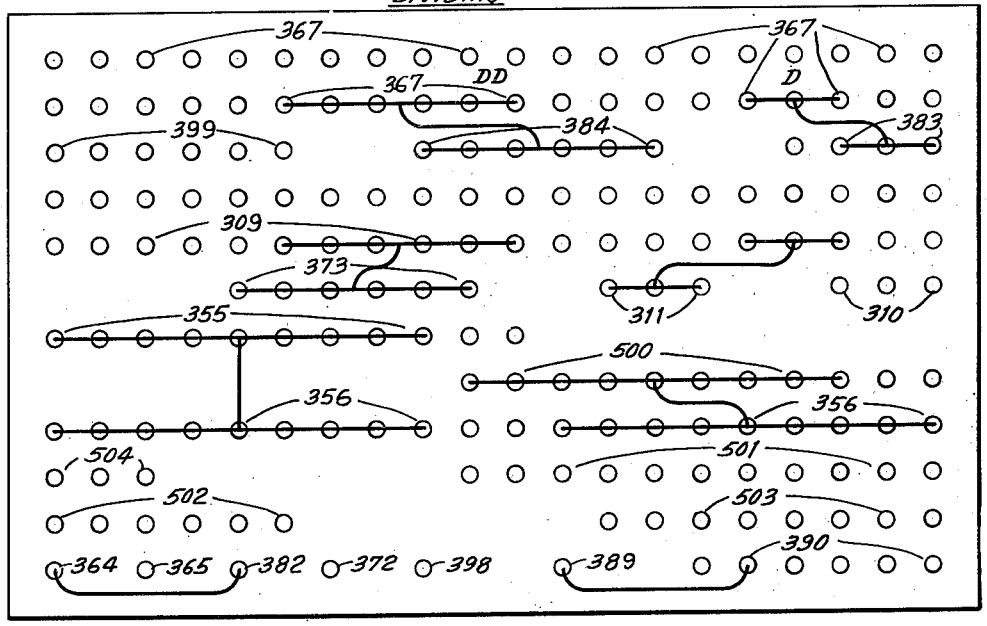
Fig. 8 shows the plugging of the insertible plug-board for a dividing calculation.

The manner in which the replaceable plugboard units 141 are wired and plugged for different computations is shown in Figs. 7, 8 and 13.

It may be explained that the plug socket reference numerals used on the circuit diagram will have similar reference numerals to those used on the diagrammatic plugboard views.

Cam timing diagrams

The cam timing diagrams, Figs. 4 to 6, inclusive are self-explanatory. It should be noted that the CC cam contacts of Fig. 4 make one revolution per machine cycle. The FC cam contacts of Fig. 5 make one revolution per card feed cycle which comprises two machine cycles. The XC contacts of Fig. 6 make one revolution for three machine cycles. The numbering of the cam contacts shown herein carrying the same designations as the cam contacts in the application of Bryce et al., Serial No. 213,044 have the same timing. Cams which have designating numbers higher than any of the numbers used in the application referred to are extra cam contacts utilized for the operation of certain mechanisms not disclosed in the application referred to.

Multiplying

It will be assumed that a set of record cards are in place in the supply magazine of the machine and the machine is plugged according to Fig. 7. The operator then closes line switch 300 (Fig. 2h). Closure of line switch 300 starts the main drive motor M into operation. Coupled to the main drive motor M is a direct current generator DC which supplies current to the line 301. The operator now depresses start key 302 (Fig. 2d) and a circuit is completed from ground through FC3 contacts, through the F1 contact through the start key 302, through relay coil E to line 301. The relay coil E being energized is maintained energized by a stick circuit through relay contacts E1 and cam contacts FC2. The energization of relay coil E closes relay contacts E2 and a circuit is completed from ground through CC29, through P1, through E2, through JJ2, through stop key contact 303, through the card feed clutch magnet 304, through D1 to line 301. The card is now fed by the card feeding and handling section of the machine and is advanced towards the reading brushes in the usual way. In starting up the machine on the run of cards the start key must be maintained depressed for two card feed cycles or it may be depressed and released and redepressed. The cyclic sequence for multiplying is shown in Fig. 28 of the parent Patent No. 2,315,686.

Figure 2B:
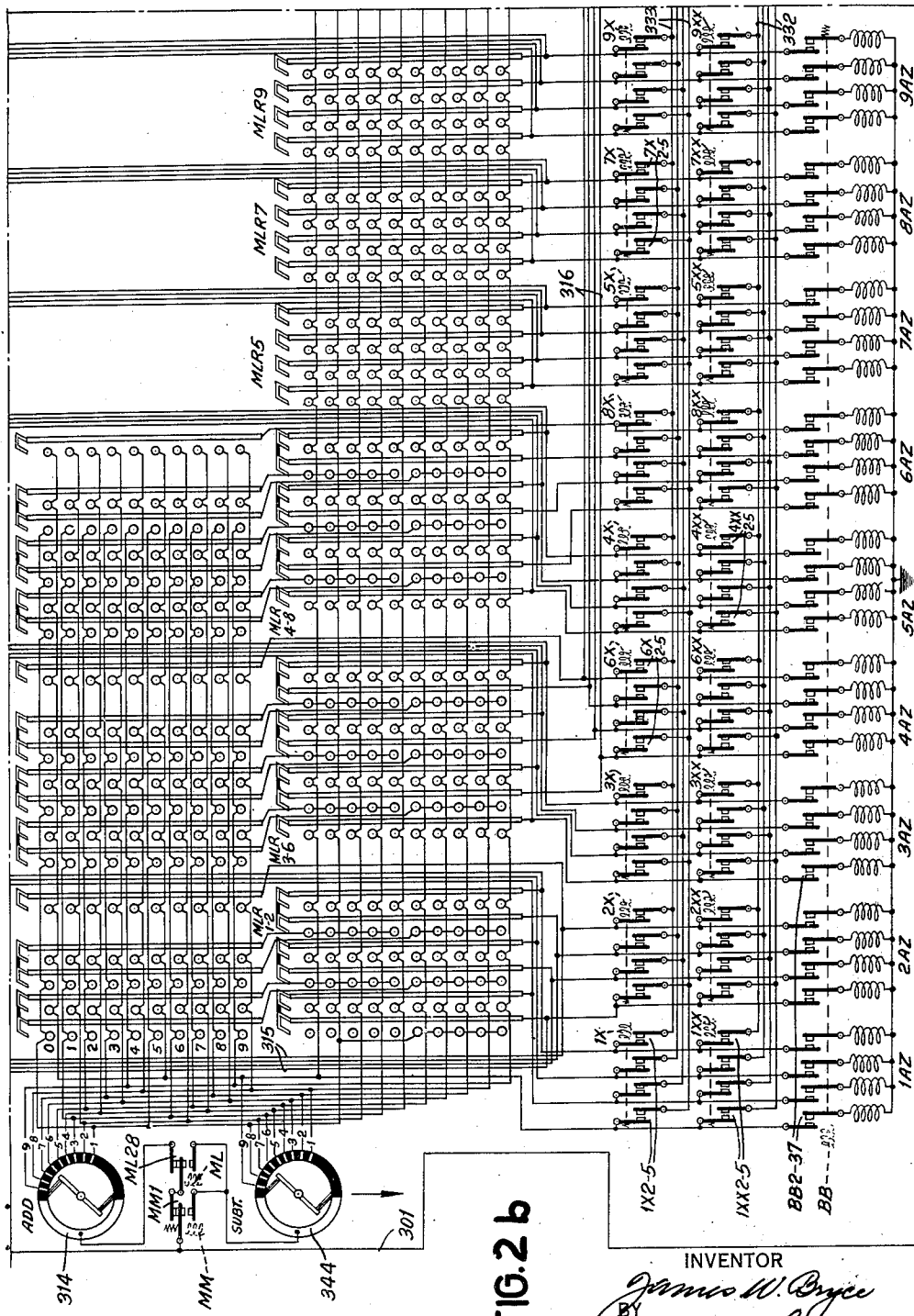
Figure 2C:
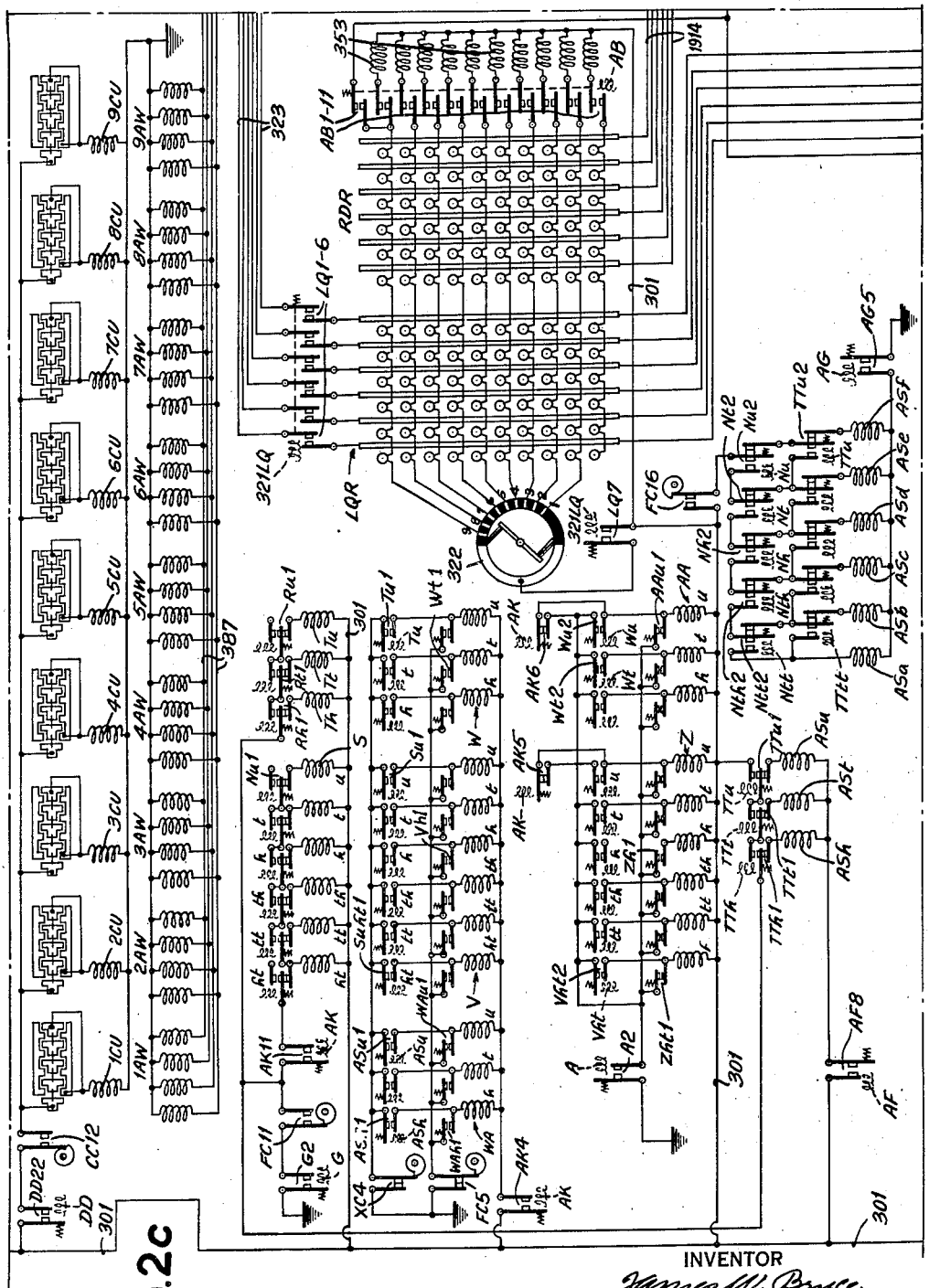

Late in the second machine cycle of the card feed cycle, the card lever contacts 305 (bottom of Fig. 2d) close, bringing about an energization of relay coil G. Energizing of relay coil G brings about closure of relay contacts G1 (Fig. 2e), which affords current supply to the FC6 contacts. These contacts upon closure permit current to be supplied to the impulse distributor 306 from which current impulses flow to the card transfer and contact roll 307. The usual regular reading brushes 308 are provided which are connected to plug hubs generally designated 309. The energization of relay coil G also causes the relay contacts G4 to become closed and a circuit will be established not only to the card feed clutch magnet 304 (Fig. 2d) in a manner previously traced but a branch circuit will be established through the G4 contacts, through the clutch magnet 312 to line 301. This clutch magnet releases for rotation the group of XC cams (see also Fig. 1) which upon release function for three machine cycles. During this second card feed cycle relay coil G causes closure of relay contacts G2 (Fig. 2c). The current flows from ground through the now closed G2 contacts through cam contacts FC11 over through contacts Rh1, through relay coil Th, to line 301. The energization of coil Th causes closure of the group of contacts Th2—4 (Fig. 2a). These contacts remain closed during the entry portion of the feed cycle. Also during the entry portion of this cycle, cam contacts XC1 close to energize relay coil K (Fig. 2d). With relay coil K energized, the K1—12 contacts (Fig. 2a) are closed. The MC amount is then entered into the ML accumulator through the Th2—4 contacts now in closed position down to the now closed K1—12 contacts. By the plug connection between plug hubs 309 to 311 the amount of this multiplicand is entered through contacts Th2—4 into the following multiple receiving devices ML1—2, ML3—6, ML5, ML7 and ML9. On the circuit diagram in Fig. 2a the prefix reference numeral 313 refers to the accumulator magnets of the multiple receiving devices. At this point it may be explained that the multiple receiving devices are commonly used for both multiplying operations and for dividing operations. In multiplication these multiple receiving devices are used to build up and store nine different multiples of the multiplicand and on division the same multiple receiving devices are used to store nine different multiples of the divisor. The multiple receiving devices have been previously described. These are in the form of electrically controlled accumulators with electrical readouts. The ML1—2, the ML3—6 and the ML4—8 receiving devices are provided with doubling readouts in addition to the usual straight readouts. The other multiple receiving devices are provided with straight readouts only. On the entry portion of the feed cycle as explained, the amount of the multiplicand is entered into five of the multiple receiving devices concurrently.

The multiplier is entered into the MP accumulator in the following manner: Through the plug sockets 310 (Fig. 2e), through the MP1—3 contacts, now in the position shown, to the 313MP accumulator magnets to ground. The amount of the multiplier is thus entered into the multiplier receiving devices. Coincidentally with this setup of the multiplier in the multiplier receiving device, there is a setup of the cycle controller and this setup is made according to the significant digits in the multiplier amount. Assuming 147 to be the amount of the multiplier, at the "7" index point in the cycle, the $AD_u$ (Fig. 2e) relay coil is energized, at the "4" index point the $AD_t$ relay coil is energized, and at the "1" index point the $AD_h$ relay coil is energized. During the entry cycle controls are set up to cut off the start key control circuit and to also maintain operation of the machine under record card control. Referring now to Fig. 2d, early in the entry cycle cam contacts FC4 close, energizing relay coil F. F being energized, it is maintained energized by a stick circuit which is completed through contacts F1 and cam contacts FC3. The shift of the F1 contacts cuts off the circuit to the start key contacts 392. Energization of F closes contacts F2 to maintain a stick circuit for relay coils F and G either through FC3 or the card lever contacts 395.

Building up of multiples

It has been previously explained that on the entry cycle, the multiplicand amount was entered into ML1—2, ML3—6, ML5, ML7 and ML9. In the machine cycle following the entry cycle there occurs the first step in the build up of further multiples. As stated, the ML1—2 device is provided with a doubling readout. This is designated MLI—2 on Fig. 2b. In this machine cycle cam contacts XC2 (Fig. 2d) close, energizing relay coil L. With relay coil L energized, relay contacts L1—16 (Fig. 2a) close and current supply is afforded through the adding emitter 314 (Fig. 2b) as follows: From line 301 through the contacts MM1 now closed, through the contacts ML28, also closed, through emitter 314, then the impulses flow over to the transverse busses of the doubling section of MLR1—2 down through the piloting section of this readout and out via a group of lines generally designated 315 (Figs. 2a, 2b). From these lines at Fig. 2b the impulses flow through the L1—16 contacts (Fig. 2a) which are now closed and ultimately reach the ML3—6, ML4—8, ML5 and ML9 accumulators or multiple receiving devices. This operation will have completed the build-up of the three multiple in ML3—6.

On the following machine cycle cam contacts XC3 (Fig. 2d) close, energizing relay coil M and causing closure of contacts M1—16 (Fig. 2a). With the emitter 314 in operation the two multiple of the multiplicand is read out from the MLR1—2 and flows via lines 315 and through the M1—8 contacts to the ML4—8 and the ML5 accumulators. This will have completed the building up of the four and the five multiples in these receiving devices. During the same cycle in which these entries are being made, the six multiple of the multiplicand is read out from the doubling readout section of MLR3—6 and such six multiple flows via lines 315, through the M9—16 contacts and finally reaches the ML7 and the ML9 receiving devices. This operation will have completed building up of the nine multiple in ML9 and the seven multiple in ML7. The multiple building up operations are now completed.

During the second card feed cycle the record card from which the factors were read is advanced to the punch tray in the usual manner. Upon reaching this tray, the contacts 317 close (Fig. 2d, right) to energize relay coil D. Energizing of relay coil D shifts relay contacts D1 (Fig. 2d, left) to a reversed position from that shown cutting off current supply from the card feed clutch magnet 304 and providing current supply for the punch rack trip magnet 318, upon closure of cam contacts CC1, with contacts P3 and the relay contacts B1 closed. The relay contacts B1 become closed by the energization of relay coil B (Fig. 2d, right), upon closure of the customary last column punch contacts P5. With the punch rack trip magnet 318 energized, contacts 319 (Fig. 2h) becomes closed and remains latched closed in the customary manner by latch 320 (Fig. 2h). Current supply is then provided for the punch driving motor PM, and endwise card feed occurs in the usual way to feed the card to the first product punching position.

Reset

Figure 2E:
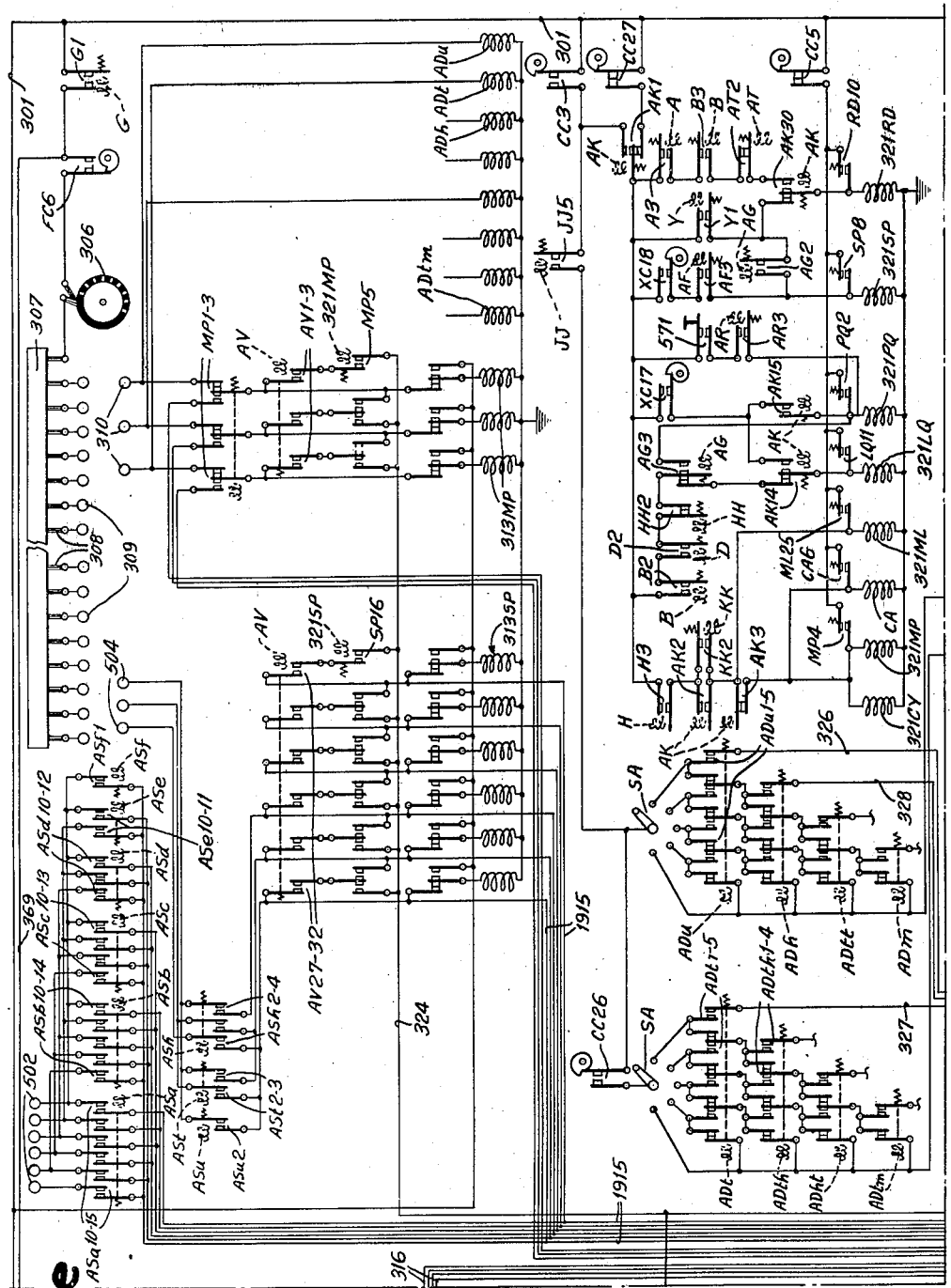
Figure 2G:
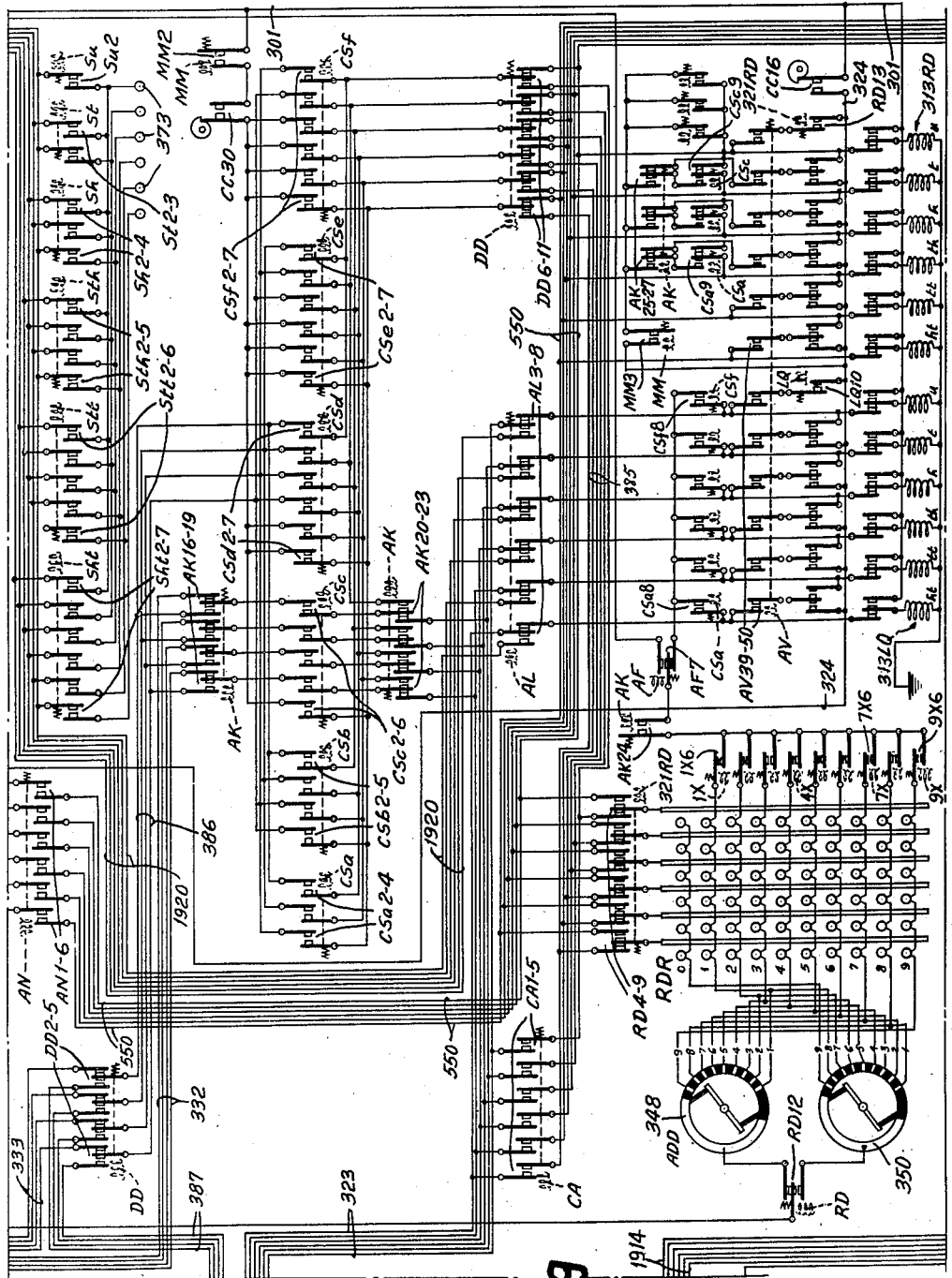

With the relay coils B and D energized in the manner previously explained, relay contacts B2 and D2 (Fig. 2e) become closed. Upon closure of cam contacts CC27 current will flow from the line 301 through these contacts through the relay contacts HH2, through the relay contacts AG3, through the relay contacts AK14, through 321LQ to ground. Reset of the LQ accumulator will then be effected. The present machine employs electric reset and provision is accordingly made to maintain the 321LQ relay coil energized during the reset cycle. This is provided for by means of stick contacts LQ11, such contacts being in a stick circuit including cam contacts CC5. Upon energization of the 321LQ relay, contacts LQ1—6 (Fig. 2c) and contacts LQ7 are now closed; thus supplying current from line 301 through LQ7 to the emitter 322. The emitter 322 is wired complementary to the LQ readouts. Complemental impulses representative of the nines complement of the amount standing in LQ flow through the now closed LQ1—6 contacts through the set of lines generally designated 323 (see also Fig. 2g), through the Al 3—3 contacts down to the 313LQ accumulator magnets to ground (Fig. 2g). By thus introducing the nines complement of the amount standing in LQ the accumulator elements are restored to a "9" position. To bring the accumulator to zero from the all "9" position, an elusive one is entered in units order at the carry time in the cycle. This entry is provided through the contacts LQ10 (Fig. 2g) which are closed in the manner previously explained. This impulse is supplied in the following manner: From line 301, through cam contacts CC16, via line 324 through the LQ10 contact, through the normal carry relay contacts AV64 controlled by the relay coil AV down to the units order of the 313LQ magnets. The units order is thus advanced one step and the electric transfer devices of the accumulator cause advance of all the other higher orders one step.

It may be explained that as long as the machine is operating cam contacts CC2 (Fig. 2d, right) close once each machine cycle at the carry time in the operation of the accumulators. Such closure of cam contacts CC2 energize relay coil AV. The energization of the coil AV closes all of the associated AV contacts. Since coil AV becomes energized once each machine cycle, the aforementioned relay contacts thus close at the carry time. The closure of these contacts permits the electric carry devices to be effective for performing carry operations whenever they are required in their related accumulators.

During LQ reset provision is made to prevent repetition of such reset. This reset preventing means is provided for as follows: During LQ reset the LQ9 (Fig. 2d, right) contacts are closed. Accordingly, when cam contacts CC6 close, a circuit is provided from ground through the AL2 contacts through LQ9, through CC6, through AK10, through HH relay coil to line 301. Relay coil HH becoming energized establishes its stick circuit through contacts HH1 and the punch control contacts P2 now closed. The relay contacts HH2 open and thus interrupt the reset initiating circuit to 321LQ (Fig. 2e).

Computing operations of the machine, that is to say the adding of selected multiples of the multiplicand into the product receiving device, are initiated by LQ reset. From the LQ9 contacts a branch circuit extends to contacts CC7, H5, through the JJ relay coil to line 301 to energize the JJ relay upon closure of cam contacts CC7. JJ relay once being energized is maintained energized by a stick circuit through JJ1 contacts, ML29 contacts back to ground. The ML contacts open earlier than is desirable so CC18 contacts in shunt with ML29 maintain the stick circuit for the required length of time. Coil JJ is the computing initiating control relay.

In general, the machine has two cycle controllers. One cycle controller derives its control from odd number columns of the multiplier. The other cycle controller derives its control from even number columns of the multiplier. Each cycle controller tries to cause its operation in the minimum number of successive machine cycles and both cycle controllers can operate concurrently. One cycle controller will direct entries into one accumulator and the other cycle controller will direct entry into the other accumulator. In the complete wiring diagram only a three order multiplier is utilized but in practice this multiplier might contain many more orders.

The cycle controller, however, is shown with provision for more than three orders, in order that its principles of operation may be disclosed and understood. The general function of this cycle controller is described in greater detail in the Bryce et al. application, Serial No. 213,044.

Upon energization of relay coil JJ in the manner previously explained, relay contacts JJ4 (Fig. 2f) are closed and upon closure of cam contacts CC28 a circuit is completed as follows: From line 301 to AK9 through CC28 cam contacts, through ML27, through JJ4, through 340SA to ground, thus energizing the stepping relay magnet 340SA. Upon energization of 340SA the stepping switch arms of the cycle controller are advanced from normal contact position to the first contact position (Fig. 2e). In Fig. 2e, the first contact position of switch SA is that which is in circuit with contacts $AD_t1$—5, $AD_u1$—5. The energization of relay coil JJ will have closed contacts JJ5 (Fig. 2e) and upon closure of cam contacts CC3 and CC26 current will flow from line 301, through CC3, through JJ5, through the $AD_u5$ contact now in closed position as brought about by the energization of the $AD_u$ magnet in the manner previously explained, down through wire 326, through the coil $CS_d$ of the column shift relay and back to ground. A circuit is also completed through contacts $AD_t5$ through lines 327 to the column shift relay magnet $CS_c$ back to ground.

The energization of $CS_d$ will close its related column shift contacts shown in Fig. 2g and direct the entry of the multiple related to the units order of the multiplier into the proper columns of the RD result accumulator. The energization of $CS_c$ will close its related column shift contacts on Fig. 2g and direct the entry of the multiple pertaining to the tens order of the multiplier and the LQ. Concurrently with the energizing of the above mentioned shift magnets $CS_d$ and $CS_c$, current supply is afforded through lines 326' and 327' to the units and tens common segments of MPR (Fig. 2f). With the problem under consideration (see Fig. 11) the multiplier amount is 147 so the brush in the units order of MPR will stand at seven and the brush in the tens order will stand at four. With the brushes in these positions, the brush in the units order will allow current to flow to the 7X multiple selecting relay. The circuit back to ground is through AK8 relay contacts now closed. The brush in the tens order will permit energization of the 4XX multiple selecting relay. The respective multiple selecting relays X and XX have stick contacts such as 7X1 and 4XX1 which, when closed, establish stick circuits which not only maintain their related multiple selecting relays energized but also maintain the selected column shift relays energized. The stick circuit for the XX relay is via line 330 which extends back to line 301 through line 331 and cam contacts CC15. The stick circuit for the X relays is via line 331 which extends to line 301, through the cam contacts CC15.

With the above mentioned multiple selecting relays energized, the related contacts such as 4XX2—5 and 7X2—5 (Fig. 2b) will become closed and a readout of the four multiple will be permitted from the readout section of MLR4—8, with the entry of such four multiple into LQ. The path of impulse flow from the contacts 4XX2—5 is via a group of lines generally designated 332 (Figs. 2b—2f) which extend to contacts AK16—19 (Fig. 2g) in the position shown and the impulses will flow through these contacts through the now closed CS$_c$2—6 (Fig. 2g) column shift contacts through the AK20—23 contacts in the position shown, through the AL3—8 contacts in the position shown through the 313LQ accumulator magnets to ground. The seven multiple will be read out from MLR7 (Fig. 2b) and the impulses will flow through the 7X2—5 contacts over a group of lines designated 333, (Figs. 2b, 2f, 2g) through the contacts DD2—5 which are in the position shown, wires 386 through the CS$_d$ contacts, through the group of contacts DD6—11 in the position shown, wires 550 through the 313RD accumulator magnets to ground.

When CC28 (Fig. 2f) closes a circuit is again completed through 340SA in the manner previously explained through JJ4 contact thus causing the stepping relay to advance the stepping arm one position, then when CC3 and CC26 again close, a circuit will be completed through relay CS$_b$ as follows: From line 301 through CC3, through JJ5 through the second step of the SA contact down through the now transferred AD$_u$—4 through the now closed AD$_h$—4 taken through CS$_b$ to ground. Concurrently a circuit is also completed through CC26 (Fig. 2f) through the transferred AD$_t$4, through the normal AD$_{th}$, AD$_{ht}$2, and AD$_{tm}$1 over through the H relay coil to ground. Also when the circuit was completed through CS$_b$ a branch circuit was completed through the MPR readout segment through the IX (Fig. 2f) multiple selector relay coil, through AK8 to ground. The IX relay upon energizing sets up its stick circuit through the IX1 points in a manner previously described. The energization of the H relay closes the H1 points forming a stick circuit as follows: From line 301, (top of Fig. 2f) through ML26, through AK37, as shown on diagram through H1 contact, through the H relay coil to ground. The operation of the IX relay closes the IX2—5 (Fig. 2b) relay points and causes entry of the ones multiple of the multiplicand into the RD accumulator in the same manner as the sevens multiple was entered into the RD accumulator, but in shifted relation as effected by the now closed CS$_b$2—5 contacts.

It will be understood that with the foregoing computation, if the multiplicand amount is 358, a seven multiple of that amount would be 2506. The four multiple would be 1432 and the one multiple would be 358. Accordingly, there would be current entry of 1432 and 2506 respectively into LQ and RD. 1432 would be entered into LQ in a tens relationship. On this following cycle the ones multiple or 358 would be entered into the RD accumulator in such shifted relationship that in effect the units value will be entered into the hundreds order position. The multiplying computation, so far as entry of selected multiples is concerned, is now complete but it will be understood that with a larger size machine further multiple selecting cycles would follow. Assuming, however, that the computation is complete the machine will now terminate multiple selecting and entering operations and controls will be conditioned for the next step of the computations. This next step involves transfer of the amount in RD over into LQ. During this same transfer cycle, there will be other operations effected as follows: The ML and MP receiving devices will be reset to zero. There will also be a reset of the cycle controller setup unit. During this same cycle in which the reset takes place the stepping switch SA will be restored to its normal or non-advanced position.

Near the end of the last mentioned multiple entering cycle, cam contacts CC28 (Fig. 2f) close and again energize 340SA. The stepping switch arms (Fig. 2e) will be advanced to the third contact position. Contacts AD$_u$3 and AD$_t$3 will be in shifted position and AD$_h$3 will also be in shifted relation and all remaining cycle controlled contacts will be in non-shifted position. Upon closure of CC3 (Fig. 2e) and CC26 a circuit will be completed through KK relay as follows: Line 301, through CC3, through JJ5, down through the SA stepping relay third position, through AD$_u$3, AD$_h$3, AD$_{tt}$2, AD$_m$1, through KK relay coil to ground. The energization of KK relay sets up a stick circuit through KK1 contacts as follows: Line 301 through ML26, through AK37 as shown on diagram, through KK1, through KK relay coil to ground. In the previous cycle H relay was energized so that we now have H3 closed and KK2 closed (Fig. 2e). Upon closure of cam contacts CC27, the MP reset and the ML reset will be initiated, and the cycle controller mechanism will be restored as follows: Line 301 through CC27, through AK1 as shown on diagram through H3, through KK2, through 321ML. Energization of the ML accumulator reset coil 321ML sets up a stick circuit for itself through ML25, back through CC5 to line 301. Branching from KK2, through AK3 through the cycle controller reset relay 321CY, the MP accumulator reset 321MP and through a relay coil CA which are in parallel, to ground. The energizing of 321MP sets up a stick circuit for itself and 321CY through the MP4 relay contacts back through the CC5. The CA relay sets up a stick circuit for itself through the CA6 relay points back through CC5. The resetting of the ML and the MP accumulators and the cycle controller has been previously explained. The energization of the CA relay closes the CA1—5 (Fig. 2g) relay points. During the same cycle the RD amount is read or transferred into the LQ accumulator in the following manner: From line 301, through RD12 contacts as shown on diagram (Fig. 2g), through the emitter 348, through the RDR readout 348, through RD4—9 contacts as shown on circuit diagram through CA1—5, through AL3—8, through 313LQ to ground.

After the foregoing operations have been completed provision should be made to terminate the computing initiating control that is, to deenergize relay coil JJ in Fig. 2d. Provision should also be made to restore the cycle controller stepping relay to its off contact position and reset of the RD accumulator should be effected and punching operations would be initiated. Furthermore, a new card feed cycle should be initiated. Deenergization of the JJ relay is brought about in the following manner: Energization of the 321ML relay will have opened ML29 contact points. With such contacts open and at a later time in the cycle upon opening of contacts CC18 the stick circuit to coil JJ will be open whereupon this relay will be deenergized. This will drop out the computing and initiating control circuits and allow the contacts controlled by relay JJ to return to the position shown in the circuit diagram.

While, as described, the initial stick circuit for KK and H coils is effected through KK1 and H1 and AK37 and ML26, ML26 later opens at a time earlier than desirable, and preferably CC36 maintains a supplementary stick circuit through KK1 and H1. As shown in Fig. 4 the supplementary stick circuit is maintained to the next cycle.

To restore the cycle controller stepping relay the contacts ML27 (Fig. 2f) are provided. Such contact shifts to a reverse position upon energization of relay coil 321ML and upon closure of cam contacts CC28 (Fig. 22f) the relay magnet 341SA will be energized. The stepping relay then assumes its off contact position. The reset of the RD accumulator is controlled through the ML30 (Fig. 2d) contacts as follows: The energization of 321ML causes closure of ML30 contacts and upon closure of CC38 a circuit is completed through the Y relay coil. The energization of the Y relay coil causes Y1 (Fig. 2c) and Y2 (Fig. 2d) contacts to close, the contacts Y2 effecting a stick circuit for the Y relay through CC37 to ground. With Y1 closed and upon closure of CC27, a circuit is completed through 321RD in the following manner: Line 301, through CC27, through AK1 as shown on diagram down through the Y1 now closed, through AK30 as shown on diagram, through 321RD to ground. The 321RD relay sets up a holding circuit for itself through RD10 contact, back through CC5 to line 301 thus causing the RD accumulator to be reset. RD12 contacts transfer to enable impulses to be sent by complemental emitter 350 (Fig. 2g) under control of RDR through contacts RD4—9 now transferred and wires 550 through 313RD accumulator magnets to ground. During the reset of the RD accumulator the punching operation is initiated in the following manner. Upon closure of CC39 (Fig. 2d) a circuit is completed from ground through CC39, through RD2, through AK12 in the position shown, through AL1 in the position shown, through J relay coil to line 301. The energization of the J relay causes J1 contact to close. Closure of J1 contacts completes a circuit as follows: From ground through J1 contact, through AL8 contact, through AB relay coil to line 301. Also from J1 contact through A relay coil to line 301. The operation of the A relay coil sets up a holding circuit for both the A relay and the AB relay through the A1 contact as follows: From ground through AK13 contact as shown, through PQ, through PQ12, through LQ8, through A1 contact, through A relay coil to line 301, a branch circuit is also traced through the AB coil and the AL8 contact. The energization of AB relay coil closes the AB1—11 (Fig. 2c) contacts which completes the circuit from the LQ readouts to the punch operating magnets 353. The energization of the A relay causes closure of A2 (Fig. 2c) contact and completes a circuit through the AK5 and AK6 contacts to AAu and the Zu relay coils, respectively. The energization of AAu causes closure of AAu1 which sets up a holding circuit for itself through AAu1 back through A2 contact to ground. The Zu sets up a holding circuit for itself in a similar manner. The AAu relay also causes closure of contacts AAu2—12 (Fig. 2d) and the Zu relay causes closure of the Zu2—12 and Zu13—23 (Fig. 2d) contacts. Punching is then effected in the following manner: From ground through AK13 (Fig. 2d) through PQ12, through LQ8, through A1, now closed, through the contact 358, through AL9 contacts as shown to the common of the column selector, through the column selector brush to the column selector segment to corresponding plug hubs 356 then by means of plug wires, through corresponding plug hubs 355, over through AAu2—12, through Zu13—23 up through the LQ readout segment (Fig. 2c) transversely across through the AB1—11 contacts, now closed, through the duplicating magnets 353 to line 301. The energization of selected one of magnets 353 will cause closure of the punch interposer controlled contacts 359 and upon closure of 359 there will be an energization of punch magnet 360.

During the RD accumulator reset, a new card feed cycle is initiated as follows: Upon closure of CC20 (Fig. 2d) a circuit is completed from ground through CC20, through RD1, now closed, through E relay coil to line 301. Energization of E relay closes E1 points setting up a stick circuit for itself through FC2. Closure of E2 completes a circuit through the card feed clutch magnet 304 as follows: From ground through CC29 through P1, through the E2, through JJ2, now closed, through the stop key 303, through the card feed clutch magnet 304, through D1 contact as shown to line 301. Also, a circuit is completed through the clutch magnets 312 as follows: From the stop key contact 303, through G4 contacts, now closed, through the clutch magnets 312 to line 301. The card feed and multiple build-up cycles follow in the same manner as previously described. Upon completion of punching operations P5 closes, energizing relay coil B. Energization of relay B causes closure of B1 contact and completes a circuit through the eject magnet 361. When the following card is fed down into the punch feed, the card lever 317 is again closed, completing a circuit through the D relay coil causing D1 contact to be transferred and completes a circuit through the trip magnet 318 upon closure of CC1, causing the punched card to be ejected and a new card to be fed to punching position. With B2 and D2 closed the LQ reset is initiated in the manner previously described. The reset of the LQ accumulator initiates the next computing cycle.

*Regular dividing operations*

On regular dividing operations (see Fig. 9) the various ML devices are utilized to afford all nine digital multiples of the divisor. The dividend amount is introduced into the PQ accumulator and then into the RD accumulator. The successive quotient digits as they are obtained are set up in LQ. The MP receiving device is not utilized on dividing. Generally the method of division which is used involves the concurrent comparing of all of the available digital multiples of the divisor with a comparison portion of the dividend in the dividend receiving device. By such comparison there is a determination of which is the largest multiple of the divisor which is less than or equal to the comparison portion of the dividend. Having made such determination there is a selection of the corresponding quotient digit and such quotient digit is entered into the quotient receiving device LQ. Also the selected largest going multiple of the divisor is subtracted from the comparison portion of the dividend. Further operations then follow for other dividend comparison operations and continue on until the computation is completed.

It may be further explained that if none of the divisor multiples are contained in the comparison portion of the dividend which is being compared there is a new comparison effected immediately with a newly selected comparison portion of the dividend and that there are no idle cycles taken upon either with unnecessary subtraction or for the introduction of a zero or zeros in the quotient receiving devices.

Before explaining the detailed operations of the machine for dividing, it may be explained that to save calculating time on dividing, provision is made to shift the entry of the significant divisor and dividend amounts to the left in their respective entry receiving devices. Such shift to the left is effected in as many columns as possible.

It may be explained that the divisor itself is entered in ML1—2 as far to the left as possible but in the other ML devices which receive entries of the divisor from the card, there is one clear column of each receiving device at the extreme left in order to afford columnar capacity for building up operations. In the dividend receiving device the dividend entry is made as far to the left as possible. In order to determine the extent of shift of both the divisor and the dividend provision is made for presensing the divisor and dividend fields of the card in a cycle preceding the actual entry cycle.

*Adjusting the machine for dividing operations*

When the machine is to be utilized for dividing the insertible dividing plugboard of Fig. 8 is first properly plugged up or it may be preplugged for a typical computation and thereafter this is inserted in the plugboard unit. On such insertible board, there is a plug connection between socket 364 (see Fig. 2h) and socket 382. With such plug connection established relay coil AE becomes energized and such relay remains energized through all dividing operations. The energization of AE relay causes closure of AE1 contact and completes a circuit through the AK relay. Thus the AK relay will also remain energized throughout all dividing computations. All of the various contacts controlled by the relays AE and AK shift to reverse position from that shown on the circuit diagram.

*Presensing and entry shift controls*

Referring to Fig. 1a, the setup relay units NR and TT are provided which in general construction are similar to the CY unit previously referred to and shown in Fig. 17 of parent Patent No. 2,315,686. In the NR and the TT units the tripping magnets are designated N and R with suitable suffixes indicating the columnar order and in the TT unit, the magnets are designated TT with suitable order suffixes. It will be understood that these magnets N, R, and TT are generally similar to the AD magnets of Fig. 17 of the parent Patent No. 2,315,686. Only the NR unit, however, is used in dividing computations.

The insertible plugboard affords plug connections between sockets 383 (Fig. 2d) and sockets 367 (Fig. 2a) for the divisor field and other plug connections are provided between sockets 384 and 367 for the dividend field.

With cards in the supply magazine, machine operations are initiated by depressing the start key in generally the same manner as explained for regular multiplying operations. During the card feed cycle, when the first card is brought to a position about to be traversed past brushes 368 (Fig. 2e), this first card will have transversed the advance presensing brushes 371. The card will finally come to rest with such advance brushes on the "11" index point but in route to this point, the brushes will have traversed the "0" index point position of the card. During such transit the advance brushes presense the presence of zeros to the left of the highest order significant digit of the amount in dividend and divisor fields.

It will be assumed that the machine is performing the division calculation of Fig. 9. With this particular calculation, there are three zeros to the left of the highest order significant digit in the dividend field. Accordingly, on transit of the card past the advance brushes a circuit is established and traced as follows: Line 301 (Fig. 2e) through the G1 contact (now closed), via line 369 (Fig. 2e to Fig. 2a) through the cam contacts FC7 (Fig. 2a), which are closed at the time of "0" line of the card passes the presensing brushes. Thence, to common conductor 370, through the brushes 371, through plug connection between socket 367 and socket 384 (Fig. 2d), through the N relays to ground. At the same time a similar circuit is completed through the R relays to ground in accordance with the zeros to the left in the divisor field.

As in regular multiplying operations a further card feed cycle now ensues and the card is traversed past the main sensing brushes. The amount of the divisor is entered into the divisor multiple receiving devices ML (Fig. 2a) and the dividend is entered into PQ (Fig. 2f).

For entry of the divisor amount, it will be necessary to shift the amount one space to the left due to the zero in the hundreds order position. This is accomplished by the fact that the $R_h$ (Fig. 2d) relay was energized as the card traversed the presensing brushes 367. The energization of $R_h$ causes the $R_h1$ (Fig. 2c) contact to transfer. Thus, when FC11 (Fig. 2c) closes, a circuit will be completed as follows: From ground through G2 contact (now closed), through FC11, through the transfer points of $R_h1$, through the normally closed points of $R_t1$, through $T_t$ relay coil back to line 301. The energization of $T_t$ (Fig. 2c) relay causes closure of the $T_t2$—3 (Fig. 2a) contacts. Thus the amount 49 instead of entering in the ML receiver units in the units and tens order will accordingly be routed to the tens and hundreds order.

Considering now the entry shift of the dividend amount, of the problem of Fig. 9 which is assumed, there are three zeros to the left of the highest order significant digit. Therefore, the $N_{th}$, $N_{tt}$, and $N_{ht}$ coils (Fig. 2d) will be energized. The energization of these relays will cause their corresponding contacts $N_{th}1$, $N_{tt}1$ and $N_{ht}1$ to be transferred and when the cam contact FC11 (Fig. 2c) closes a circuit will be completed as follows: From ground through the G2 contact (now closed), through FC11 cam contacts, through AK11 contact (now closed), through $N_{ht}1$ (now transferred), through $N_{tt}$ (now transferred) through $N_{tt}1$ (now transferred), through $N_h$ in normal position, through $S_h$ relay coil, back to line 301. The energization of $S_h$ coil causes the $S_h2$—4 (Fig. 2g) contacts to close. As is shown in the plugging diagram (Fig. 8), the dividend amount is plugged from plug hubs 309 (Fig. 2e) to plug hub 373 (Fig. 2g) and the closure of contacts $S_h2$—4 causes the amount 864 to be entered into the PQ accumulator in the extreme left hand position, that is the 8 is entered into the highest order position of the accumulator, the 6 in the second highest order, etc.

Summarizing, the foregoing includes a column shift arrangement between the lines coming from the reading brushes through the plugboard and lines which read to the PQ accumulator. Selective column shift will be effected according to the number of zeros preceding the highest order significant digit.

At this point it may be explained that it is necessary to retain a setup which corresponds to the entry column shift control for controlling final recording operations after the division calculation is complete. Such setup is retained on selected V and W relay coils (Fig. 2c). Relay coil Sh was energized and with such coil energized, there will be an energization of Vh which relay is retained energized for controlling shift back upon recording. Likewise, relay coil Tt was energized so there is a corresponding energization of Wt which relay is retained energized for controlling recording.

Referring to Fig. 2c, before contacts FC11 open a circuit is established from ground through XC4 cam contacts, through Sh1 contact, through Vh relay coil, through AK4 contact (now closed) back to line 301. This will energize relay coil Vh and such coil upon being energized closes its stick contacts Vh1, a return circuit being completed to ground through the FC5 cam contacts (now closed). A branch circuit also extends through the now closed Tt1 contact, through the Wt coil, through the AK4 contact (now closed) to line 301. Relay coil Wt once energized closes its stick contact Wt1 and a return circuit extends through the FC5 cam contacts to ground.

After the foregoing operations are effected and during the following machine cycle which ensues multiples of the divisor amount are built up in the various ML devices and since this build-up is effected exactly in the same manner as for multiplying, it will not be described in detail.

It should be mentioned that during the second half of a card feed cycle, there is a reset of the N—R and the TT setup units. Late in the first half of the card feed cycle cam contacts XC5 close (Fig. 2h) and a circuit is completed from ground through the AK28 (now closed), through XC5, through both 321N—R and 321TT to line 301. The energization of 321N—R and 321TT releases the respective one revolution clutch (see Fig. 1a) so that any previously tripped N1 and R1 or TT1 contacts may be latched up in order that they may again be tripped near the end of the card feed cycle when presensing of a following card is effected. During the second machine cycle of the card feed cycle, the dividend amount which is entered into the PQ accumulator in shifted relation is transferred to the RD accumulator. This is accomplished in the following manner: When cam contacts FC15 (Fig. 2h) close a circuit is completed through the AN relay coil as follows: From ground through the FC15 cam contact, through AK29 (now closed), through the AN relay coil to line 301. The energization of the AN relay coil causes the AN1—6 (Fig. 2g) contacts to be closed and complete a circuit from the PQ accumulator readout PQR to the RD accumulator in the following manner: From line 301, through the normally closed points of PQ10, to the emitter 510 and impulses are then sent through the PQ readout PQR and down through the AN1—6 contacts (now closed), through the wires 550 (Fig. 2g) and down through the 313RD accumulator magnets thus setting up the dividend amount in the RD accumulator in its proper shifted relationship.

On multiplying operations the 321LQ reset relay was energized to initiate computing operations under the control of cam contacts CC27 (Fig. 2c) through a circuit fully traced. On dividing calculations relay coil AK is energized. Accordingly, the circuit to 321LQ is from the CC3 (Fig. 2c) cam contacts, through the now shifted AK1 contact, through cam contact XC17, through the now shifted AK14 contacts, through the 321LQ reset relay coil to ground. A parallel circuit is also completed through AK15 contact and 321PQ. With 321LQ energized reset of LQ occurs in the same manner as explained for multiplying. Such reset brings about energization of the computing initiation relay coil JJ (Fig. 2d) in the manner previously explained. Also upon LQ reset the LQ12 contacts (Fig. 2f) are closed and since the machine is set for dividing contacts AK7 are closed. Current will be supplied through the cam contacts CC17 (Fig. 2f), through the AK7 contacts, through LQ12 contacts, to the divisor reset coils 321AZ, of the comparing units. This will release all of the divisor side sections and allow them to be restored so as to be in a position to receive a setting of the divisor multiples thereon.

The machine is now ready to compare the comparison portion of the dividend with all of the divisor multiples in general. This is effected by reading out a comparison portion of the dividend from the RD readout device setting such portion of the dividend up on one side of the comparing units and at the same time reading out from the multiple readouts of the various divisor multiples. Each of which multiples becomes set up on one section on the other side of the comparing units. This operation will now be traced on the circuit diagram.

It will be recalled that during the multiplying operations the comparing units CU were not in operation. In dividing computations, however, such units are placed in operation. This is effected by maintaining energized clutch magnet 342 (Figs. 1a and 2h). This circuit for energizing clutch magnet 342 is completed from line 301, through 342, clutch magnet coil, through AK28 (now closed) to ground. The maintained energization of 342 releases a one-revolution clutch to place the drive shafts 94 and 97 of the CU units (Fig. 1a) in timed operation with shaft 50.

A comparing cycle is initiated by the energization of relay coil LL (Fig. 2f) which becomes energized in the following manner: As previously explained the computing initiation relay JJ was energized upon LQ reset. The energization of such relay closed contacts JJ3 (Fig. 2f). A circuit is completed from line 301, through the now shifted AK9 contacts, through the CC9 contacts and through all of the 9CU1, 8CU1, etc., transfer contacts now in the position shown and finally through the 1CU1 contacts, through the JJ3 contacts (now closed), through the LL relay coil and back to ground. LL once energized is provided with a stick circuit extending back to line 301, through stick contacts LL1 and cam contacts CC13. After the foregoing stick circuit is established, cam contacts CC14 close and establish a circuit through the non-shifted H2 contacts, to energize a magnet 340SB of the SB stepping switch. With magnet 340SB energized, the switch arms SB of this relay (Fig. 2f) are stepped to the first contact position.

Shortly after the switch arms of the stepping relay have advanced to this position, a circuit is completed from line 301, through the H4 contacts (as shown), through cam contacts CC8, through the switch arm of the stepping relay, through the CSa column shift relay coil and back to ground. Another circuit is established through the CC11 contacts, through the LL2 contacts (now closed) through the stepping relay switch arm, through the BB relay coil and back to ground. A branch circuit is also established to energize relay coil DD. With coils BB and DD energized they are maintained energized by their respective stick contacts BB1 and DD1. The stick circuit extends back to line through cam contacts CC10, through H4 to line 301.

It may be explained that column shift relay CSa and relay coil DD cooperate to control the readout of the dividend comparison portion from the RD accumulator readout and contacts BB are utilized to control the readout of the various divisor multiples from the MLR readout devices.

The manner in which a comparison portion of the dividend is set up on comparing units will now be described. It will be understood that the comparison portion of the dividend includes a selected number of columns. The number of columns selected is determined at this time by the CS₁ relay. Referring to Fig. 2g, a circuit is completed from line 301, through RD12 contact as shown, to the add emitter 348. With such emitter in circuit, impulses are emitted through RDR, through the non-shifted RD4—9 contacts via a set of lines 385, through the now shifted DD6—11 contacts, through the now closed CS₁2—4 contacts, via lines 386, through the shifted DD2—5 contacts, via lines 387 (see also Fig. 2c), to the dividend side comparing magnets generally designated 1AW, 2AW, etc.

It will be understood that the comparison portion of the dividend is set up in multiple in the comparing units that is to say, there are 9 identical setups of the comparison portion of the dividend in order that there can be a comparison between each setup and the 9 different divisor multiples. In the problem under consideration, the comparison portion of the dividend which was set up is the amount of 864 (see also Fig. 9). The setup of the multiples of the divisor on the other side of the comparing unit sections will now be described.

It has been previously explained how relay coil BB (Fig. 2f) becomes energized. With such relay coil energized, all of the contacts BB2—37 (Fig. 2b) become closed. The add emitter 314 is placed in the circuit in the following manner: From line 301 through the non-shifted MM1 contacts, through the non-shifted ML28 contacts, to the emitter 314. Such add emitter will transmit impulses to and through all of the MLR readout devices and the multiple amounts available on such readouts will be individually transmitted through the now closed BB2—37 contacts, to the various divisor multiple comparing magnets 1AZ, 2AZ, 3AZ, etc. It will be understood that the divisor multiple side of the comparing units will receive setting of the different divisor multiples. The comparing units operate in the manner previously explained to make suitable settings of the brushes upon these comparing conductors.

Having then entered both the dividing comparison portion in a multiple manner into the comparing units and having entered the various multiples of the divisor in the other side of such comparing units, the brush devices of the comparing units receive their settings in the manner previously explained to indicate a greater than, an equal to, or a less than condition.

Referring to Fig. 2c, it will be noted that comparing unit commutators are shown as sectionalized one for each multiple. For each section there is an associated relay coil such as 9CU for a 9 multiple and 8CU for an 8 multiple and so on. The brush section of the comparing devices is adapted to prevent energization of all magnets relating to multiples which are higher than the comparison portion of the dividend, and to permit energization of magnets related to multiples equal to or less than the comparison portion of the dividend.

With the problem of Fig. 9, the only magnet which will be energized is relay magnet 1CU. The circuit energizing this magnet is from line 301 (Fig. 2c), through DD22 (now closed), through cam contacts CC12, through the one's multiple comparing section, through the 1CU relay coil to ground. At this point, it may be explained that if the 4 multiple was the selected multiple, the 4CU coil, the 3CU coil, the 2CU coil and the 1CU coil would be energized and all higher number magnets above 4CU would not be energized.

During a comparing cycle which takes a single machine cycle the setup of the comparison portion of the dividend and of all the divisor multiples is made in the first portion of the comparing cycle. Immediately after the setup is made and in the same machine cycle, testing is effected. Testing is done concurrently for all multiples.

Referring now to Fig. 2f the energization of relay coil 1CU will have shifted relay contacts 1CU1 to the reverse position from that shown and upon closure of CC9, current flows through the contacts 1CU1 to and through the 1X multiple selecting relay and through the MM relay to ground. The multiple selecting relay 1X is maintained energized through stick contacts 1X1, the stick circuit extending back to line, through CC15. It may be mentioned that this 1X relay coil is energized in the comparing cycle, just after the commutator test is made, and that such relay is maintained energized through a portion of the next cycle, to select the one multiple which is to be read out from the MLR1 device, and such multiple is to be subtracted from the dividend comparison portion of the divisor. The 1X multiple selecting relay also selects a related quotient digit for entry into the quotient receiving device LQ. Relay coil MM is maintained energized as long as the 1X coil is maintained energized, being in circuit therewith. Previously, when subtractive entries were made for resetting purposes the elusive one was introduced into the accumulator to bring the all nine setting of the accumulator wheels to a zero setting, after the complementary entry. In subtracting the divisor multiple, however, the elusive one entry is made during a comparing cycle. In this connection, it is to be noted that such elusive one is only introduced into the RD accumulator in the event that a multiple is to be subtractively introduced into such accumulator in the following cycle. If no such multiple is to be introduced, the entry of such elusive one in the comparing cycle is suppressed.

At the carry time in the comparing cycle, the carry impulse flows from line 324 (Fig. 2g) through the now closed MM3 contacts, through the AK25 contact now in shifted position, through the CS₁8 contact now in shifted position to and through the 313RD accumulator magnet in the thousands order. It may be explained that the order in which such entry is made is selected under control of coil CS₁ in this instance by the CS₁8 contacts. Such carry impulses for subsequent steps of the computation thereby will be introduced in other orders.

It has been explained that if there was no going multiple for any given comparison portion of the dividend that no elusive one entry would be made. Such entry is suppressed because of the fact that in the event that no going multiple is found on test none of the X magnets will be energized because none of the ICU to 9CU relays will be energized. With no X coil energized, there will be no energization of coil MM and accordingly with MM deenergized the MM3 contacts will remain open and no elusive one entry can be effected. On a comparing cycle with a relay coil such as ICU energized, the energizing circuit to coil LL (Fig. 2f) will be interrupted since a shift of contacts ICU1 cuts off the circuit.

Unless LL is energized, it is impossible to energize the stepping switch magnet SB. All of the SB switch arms remain on their first contact position and inasmuch as contacts LL2 are open even though cam contacts CC11 close, there will be no energization of either BB or DD, however, relay coil CSa will be energized again under control of CC8 on the next machine cycle following the above described comparing cycle. Accordingly, the CSa2—4 contacts (Fig. 2g) will be again closed on the following machine cycle. After the comparing cycle, in such cycle, the relay MM is maintained energized as explained before. Accordingly, relay contacts MM1 (Fig. 2b) are shifted to reverse position from that shown and a circuit will be established from line 301, through the shifted points of MM1 contact to the subtract emitter 344. Such emitter will emit 9's complemental impulses through the MLR1 readout only. Impulses flow out of this readout, through the IX2—5 contacts which are maintained closed by the energization of IX relay during this cycle. 9's complementary impulses respective of the 9's complemental 490, i. e., 509 flow over the lines 33 (Figs. 2f, 2b, and 2g) through the contacts DD2—5 in the position shown, over the lines 386, through the now closed CSa2—4 contacts, through the non-shifted DD6—11 contacts and through the proper columnar order of the RD accumulator energizing the proper 313RD magnets. This operation will deduct the amount of 490 from the amount of 864. It will be recalled that the elusive one entry for the accumulator has been previously made and the regular transfer mechanism of the accumulator will provide for transfer to higher orders when required.

*Entry of quotient digit*

With the multiple selecting relay coil IX energized a supplemental contact IX6 (Fig. 2g) will be closed. The RD12 contact is as shown and thus by means of add emitter 348 a one impulse will be entered through the LQ accumulator in the proper order as follows: Line 301, through RD12 as shown, to the 348 emitter. Impulses are thus sent out through the X6 contacts; in this instance the IX6 contact, through the AK24 contact (now closed) through the AF7 contact as shown, through the CSa8 contact, down through the 313LQ magnet in the highest order position to ground, thus causing a "1" to be entered in the LQ accumulator.

On the quotient entering and subtracting cycle inasmuch as the DD relay coil was not energized contacts DD22 (Fig. 2c) are in open position. Accordingly, even if CC12 contacts close there will be no energization of any of the CU relays. With none of such coils energized, the ICU1, 2CU1, etc., contacts of Fig. 2f remain in the position shown and upon closure of CC9 the current supply is afforded through the JJ3 contact to energize relay coil LL. Relay coil LL when energized will close its stick contacts as before described and there will be another energization of stepping relay coil 340SB under the control of contacts CC14. Accordingly, switch arms of SB will step to the second contact position. After comparison is made with one dividend comparison portion at the time the multiple selecting relays are energized under control of contacts CC9 a supplemental circuit is established through coils 321AW to ground. These coils are the reset coils of the comparing unit corresponding to the comparison portion of the dividend. With such coils energized, the dividend comparison side of the comparing units become restored so that a new dividend comparison portion can be introduced therein. It will be understood that the divisor multiple side of the comparing unit retains the divisor multiples during all the deducting and quotient entering operations. Referring to Fig. 9, the RD accumulator now has standing in it the remainder amount of 374000. There is now to be another comparison operation and with such comparison operation there is a different comparison portion of the dividend selected for comparison. In Fig. 9, it will be noted that the first comparison which has been previously described pertains to the three extreme left hand orders of the dividend and the second comparison pertains to the four extreme left hand orders of the dividend. There must accordingly be a column shift to take a different comparison portion of the dividend from the RD receiving device.

It has been previously explained how the SB stepping switch was brought to the second contact position. It was also explained that the relay coil LL was energized. With relay coil LL energized, relay contacts LL2 are closed and accordingly upon closure of cam contacts CC11 a circuit is completed through a switch arm of the stepping switch to energize relay coil DD. It will be noted that there is no energization of relay coil BB because the second contact of the stepping switch and those thereafter are not wired in circuit to relay coil BB. With relay coil DD energized, it is maintained energized in the customary manner and following its energization, cam contacts CC8 close and a circuit is established to energize column shift coil CSb. It will be noted that relay coil CSa is not now energized since the switch arm of the stepping switch is in the second contact position. With the coil CSb and relay coil DD energized, their associated contacts shift to a reverse position from that shown in the circuit diagram.

Referring to Fig. 2g, with coils CSb energized, contacts CSb2—5 close and there is a new readout relation established with RDR. The readout relation is now such that the four left hand columns of RDR are selected for readout and for controlling the entry into the dividend side of the comparing unit. The entry circuit is similar to the one just previously described when the first three left hand digits of the dividend were entered into the comparing portion of the comparing unit. With the exception that instead of the circuit being completed through the contacts CSa2—4 the circuit is now completed through the contacts CSb2—5.

It will be recalled that the divisor multiples still remain set up in the divisor side of the comparison unit. There is now a further comparison effected into the comparison commutators and circuits of the comparing unit bring about an energization of all of the CU coils from ICU to and including 7CU and coils 8CU and 9CU remain deenergized. With the seven comparison relay coil energized, the related relay coil 7X (Fig. 2f) becomes energized under the control of CC9, over the circuit previously described but which in this instance is completed through the now shifted 7CU1 contacts to the multiple selecting relay 7X. When relay coil 7X is energized relay coil MM likewise becomes energized in the manner previously explained. Both 7X and MM are held energized through the 7X1 stick contacts.

In the comparing cycle and at the carry time in such cycle provision is made for introducing an elusive one into the RD accumulator, into the fourth order from the left. Such elusive one entry is made generally in the manner previously explained except that at this time the CSb9 contacts are in shifted position due to the energization of CSb. With relay coil MM energized, the MM3 contacts are closed and a circuit is completed from line 324 at the carry time through MM3, through the now shifted AK26 contacts through the now shifted CSb9 contacts down through the hundreds order 313RD accumulator magnet. This will enter the elusive one in such order. On the following cycle the seven divisor multiple is entered subtractively into the RD accumulator and the seven quotient digit is entered in the proper columnar order of LQ.

Referring to Fig. 2b, energization of the 7X multiple selecting relay coil brought about as previously explained will close the 7x2—5 contacts. Energization of relay coil MM will shift MM1 contacts to reverse position and place the 9's complementary emitter 344 in circuit with line 301. 9's complementary impulses flow from the 344 emitter through the MLR7 readout, out through the 7x2—5 contacts to the lines 333, through the non-shifted DD2—5 contacts, through the CSb2—5 contacts, through the DD6—11 contacts to the four left hand accumulator magnets of the RD accumulator. This will enter the 9's complement of the 7 multiple of the divisor into such accumulator. Concurrently with the foregoing deduction operation, the 7 quotient digit is entered into the LQ. The energization of relay coil 7X will have closed contacts 7X6. Add emitter 348 will now complete a circuit which will extend from line 301 through RD12 in the position shown, through the 7 spot of the add emitter 348, through the closed 7X6 contact, through the AK24 contact now closed, through the AF7 contact in the position shown, down through CSb8, through the 313LQ accumulator magnet in the second order position from the left. This will enter the seven quotient digit in such order of this accumulator.

Referring now to Fig. 9, it will be noted that in the typical example there illustrated, the quotient is only carried out to two significant digits. In this machine due to the method of checking later to be described it is necessary to retain the remainder and punch such remainder in the record card along with the quotient amount. The computation therefore is completed and termination of the computation is to be controlled by the place limiting device which is provided for this purpose.

*Place limiting device*

The insertible plugboard (Fig. 8) will have provided a plug connection from socket 389 (Fig. 2f) to the second socket 390 (Fig. 2f also) from the left. The second socket from the left is plugged up because the computation is to be carried to two quotient places. If the computation was to be carried to further quotient places, the third or fourth socket 390 from the left would be plugged up. During the multiple deducting cycle just described, relay coil DD (Fig. 2c) will be deenergized and accordingly the DD22 contacts remain in open position and there will accordingly be no energization of any of the CU relay coils. With none of such relay coils energized, the 1CU1 to 9CU1 contacts will remain in the position shown so that upon closure of cam contacts CC9 (Fig. 2f) relay coil LL will become energized. With such relay coil LL energized, the relay contacts LL3 (Fig. 2f) will be closed and upon closure of CC17 a circuit will be completed from line 301 through CC17 through LL3, through the second SB stepping relay switch contact to the plug hub 390 then by plug connection to plug hub 389 through relay coil H back to ground; H being energized closes its stick contacts H1 and the stick circuit is completed back to line, through the AK37 contacts which are transferred, through the RD11 contacts in the position shown to line 301.

The energization of relay coil H will have shifted relay contacts H2 (Fig. 2f) to a reverse position from that shown at a time prior to the closure of cam contacts CC14. Accordingly with such CC14 contacts closed, a circuit is completed through the stick contacts of LL1 of the LL relay coil, through the CC14 contacts through the transfer points of H2, through the relay magnet 341SB of the stepping switch. With this operation due to the shift of contacts H2, the stepping switch magnet 340SB will be out of the circuit. Energization of the 341SB relay magnet will release the stepping switch and allow it to return to the position shown in the circuit diagram. It may be noted that no circuits are inadvertently established by the stepping switch arms on SB upon restoration because on restoration the H4 relay contacts are in open position. The foregoing restoration of the stepping switch and opening of contacts H4 terminate further energization of the CS magnets, the BB and the DD magnets.

The machine has now reached the stage in its operation in which it is ready to record the quotient upon the record card. The various ML multiple receiving accumulators can now be reset. Before recording is effected there must be a change in the readout relation between LQR and the punch and between RDR and the punch, according to the entry shift which was previously made upon entry of the divisor and dividend amounts. Reset of the ML device is brought about in the following manner: Energization of relay coil H (Fig. 2f) in the manner previously explained will have caused closure of relay contacts H3 (Fig. 2e). Upon closure of cam contacts CC3 a circuit is established from line 301 through CC3, through transferred points of AK1, through H3, through AK2 (now closed), through 321ML to ground. The 321ML coil sets up a stick circuit for itself by means of its stick contact ML25 back through CC5, to line 301. The energization of 321ML effects reset of the multiple receiving device. It will be recalled that upon completion of multiplying operations, relay coils AAu and Zu (Fig. 2c) were only energized just prior to recording. On dividing operations, however, due to a shift in the entry of the divisor and dividend there must be a selected energization of the Z and AA coils. With the computation under consideration, the coils which will be energized on dividing are $Z_h$ and $AA_t$. The selected energization of the Z and AA coils is brought about under control of the presensing control, which presensing control, it will be recalled, has selected certain energization of W and V relay coils, that is the $W_t$ and the $V_h$ relay coils in the example under consideration.

The energization of 321ML brought about as previously explained will have caused closure of contacts ML31 (Fig. 2d). Upon closure of cam contacts CC40, a circuit is completed as follows: From ground, through CC40, through ML31 through the shifted points of AK12, through the AL1 contact as shown, through J relay coil to line 301. The energization of the J relay causes closure of J1 contact which in turn completes a circuit through the AB and A relay coils as follows: From ground, through J1 contact (now closed), through AL8 contact, through AB relay coil to ground, also branching off from J1 contact, through the A relay coil to ground. Energization of the A relay causes closure of its stick contact A1 which sets up its stick circuit back through RD3 and the shifted points of AK13. Closure of A1 contact also acts as a stick contact for AB relay coil. Energization of the A relay coil also causes closure of A2 (Fig. 2c) contact completing a circuit as follows: From ground, through A2 contact, through $V_h2$ down through $Z_h$ relay coil to line 301. A branch circuit is also established through $W_t2$ contact, through $AA_t$ back to line 301. Energization of $Z_h$ closes the $Z_h1$ contact setting up a stick circuit for itself back through A2 contact. Likewise, the $AA_t$ relay sets up a stick circuit by $AA_t1$ contact. Energization of $Z_h$ relay also closes contacts $Z_h2$—12 (Fig. 2h) and $Z_h13$—23 (Fig. 2d). Energization of $AA_t$ causes closure of contacts $AA_t2$—12. Energization of relay coil AB causes closure of contacts AB1—11 (Fig. 2c) coupling the punch duplicating magnets 353 (Fig. 2c) to the transverse connections of the LQR and RDR readouts (Fig. 2c). As shown in the plugging diagram (Fig. 8) plug connections are made from plug hubs 355 (see also Fig. 2d) to plug hubs 356, also from plug hubs 500 to plug hubs 356 at the proper columnar position. Accordingly, a circuit is then completed from line 301, through punch duplicating magnet 353, through contacts AB1—11, through the LQR and RDR readouts down through the (to Fig. 2d) $Z_h13$—23 contacts across and down through the $AA_t$ contacts to plug hubs 355 and then by means of plug connections to plug hubs 356, through the commutator segment and the commutator brush to the commutator common section, through AL9 contact in the position shown, through punch contact 358 now closed, through A1 contact (now closed), through RD3 contact as shown, through the AK13 contact in shifted relation to ground. The circuit just described coming from the LQR readout effects punching of the quotient digit. The remainder amount is read out from the RDR (Fig. 2c) readout down through the $Z_h2$—12 contacts, by wires 1914 (Figs. 2c–2g and 2h), to plug hubs 500 (Fig. 2h) thence by plug connection to plug hubs 356 and thence over the circuit previously described.

After all the information stored in both LQR and RDR has been punched in the record card, the card is automatically spaced out to the last column position. Upon reaching said last column position, contact P5 (Fig. 2d) closes and completes a circuit through the B relay coil. Energization of the B relay coil causes the B3 (Fig. 2e) contact to close and complete a circuit as follows: Line 301, through CC3, through AK1 in shifted position, through A3 now closed, through B3 now closed, through AT2 as shown, through AK30 in shifted relation, through 321RD. A stick circuit is set up for 321RD relay, through RD10 contact, back through CC5 contact, to line 301. Energization of 321RD initiates reset of the RD accumulator. The energization of 321RD also opened RD3 (Fig. 2d) contact and at a later point in the cycle when CC19 opens the stick circuit for relays AB and A will be opened thus deenergizing the relay coils A and AB, restoring their associated contacts to their normal positions as shown. The energization of relay coil 321RD also opens RD11 (Fig. 2f) to open the stick circuit of relay H but a supplementary stick circuit is maintained through H1 and cam contacts CC36. The energization of 321RD also causes closure of RD1 (Fig. 2d) and when CC20 closes, a circuit is completed as follows: From ground, through CC20, through RD1 contact, through E relay coil to line 301. Energization of the E relay coil initiates a card feed for the next calculation.

To prevent successive resetting of the RD accumulator, the following precautionary circuit is preferably utilized. The energization of 321D causes RD14 contacts (Fig. 2h) to close and upon closure of cam contacts CC41 a circuit is completed through the AT relay coil, causing contacts AT1 to be closed and AT2 (Fig. 2e) to be opened. The latter opens the energizing circuit for 321RD. The stick circuit for the AT relay extends through the AT1 contacts and by a line which extends from Fig. 2h to Fig. 2d to the P2 contacts to ground.

Checking the factors and quotient result of dividing computations by multiplying For the purpose of checking the quotient results and the remainder derived as a result of dividing operations effected by the machine disclosed herein, the machine is provided with means for checking such results, that is, using the divisor as a multiplier, the quotient as a multiplicand and then effecting a multiplying operation. The newly derived product is entered into an accumulator in which the dividend amount is subtractively entered and the addition of the remainder, if any, will bring this accumulator to zero. Therefore, in addition to the regular multiplying operations, the machine goes through checking operations to determine whether the previous dividing operation has been correctly performed.

In setting up the machine for checking-dividing computations, the universal plugboard is provided with the plug connections shown in Fig. 13. Figs. 12 and 10 outline the procedure followed in checking operations of the type just described.

Checking operations are accomplished by rerunning the cards through the machine and as outlined in Fig. 10, the quotient amount is utilized as the multiplicand and is read into the ML accumulators and multiples thereof are built up as in regular multiplying operations. The divisor amount is utilized as a multiplier and accordingly is entered in the MP accumulator. The dividend amount is entered in the SP accumulator and then transferred to the PQ accumulator as a tens complement. In the event that the previous dividing operation should wind up with a remainder, this amount is read from the card and subsequently entered in the PQ accumulator.

In carrying out dividing computations, the quotient derived and the related remainder can be either a whole number or a decimal, depending upon the decimal point location of the dividend and the divisor. Therefore, the result recording will be punched on the record at predetermined denominational columns and the digits will be recorded to the right or left of the decimal point which is identified in the series of plug hubs 355 (Fig. 2d) and the plug hubs 500 (Fig. 2h) by a dotted line DP. Digit recording to the right of the dotted line will indicate decimal values and digits punched at the left of such lines will be whole numbers. However, in checking operations, such values are treated as whole numbers irrespective of the decimal point location of the results. In accordance with this, the present machine provides means to shift the entries in the ML and RD accumulators. Accordingly, with respect to the dividend amount, a denominational shift takes place so that the dividend amount will be entered in the SP accumulator in proper denominational orders. The remainder, it will be noted from Fig. 10, is shifted denominationally so that the entry will be made in the denominational orders at the extreme right of the RD accumulator. A denominational shift is also effected for the quotient entry so that it will be entered in the proper orders of the ML accumulators, enabling the building up of multiples in the proper denominational places.

As has just been stated, the machine is provided with means to effect the denominational shift of the entries and such means will now be described. At the outset, it will be noted that with particular reference to Figs. 13 and 2h that a plug connection is made between the plug hubs 364 and 398, thereby causing the energization of the relay AG. The AG relay closes its contacts AG1 and thereby effects the energization of the relay magnet AL. Therefore, it will be noted that as long as the plug connection is made, both the AG and AL relays will be energized.

It will be recalled that the brushes 371 (Fig. 2a) are the presensing brushes and by such analyzing elements the quotient and remainder are presensed to determine the presence of zeros at the right of the first significant digit in both the quotient amount and the remainder and a denominational shift is made accordingly. From the plug hubs 367 at the right of the decimal point of the quotient representing field there are plug connections to the plug hubs 399, as is shown in Fig. 13, and also with reference to this figure there are plug connections from the plug hubs 367 at the right of the decimal point of the remainder representing field to plug hubs 384. The plug hubs 384 and 399 are also shown in Fig. 2d and by means of the plug connections and the circuit now to be described in detail, the TT relays and N relays will be selectively energized. When the card passes the analyzing brushes 371, cam contacts FC7 (Fig. 2a) will be closed at the time the zero index point position passes the brushes, thereby closing a circuit from the line 301 through G1 (Fig. 2e) contacts now closed, to cam contacts FC7 (Fig. 2a), contact roll 370, analyzing brushes 371, plug hubs 367, by the plug connections previously described to plug hubs 399, to the TT relays (Fig. 2d) and then to the ground. Since there are five zeros at the right of the decimal point of the quotient value in the problem adopted, relays TTu through to TTtt will be energized. The circuit just described will also effect the energization of the N relays because of the plug connections between the plug hubs 367 associated with the remainder and the plug hubs 384 and since in the remainder there are five zeros at the right of the decimal point, relays Nu through to Ntt will be energized. Referring to Fig. 2c, the energization of the relays Nu through to Ntt will transfer their contacts so as to effect the closure of a circuit from the line 301 through cam contacts FC16 through the transferred contacts NTu2 through to Ntt2 to the relay AS$_a$ thence through contacts AG5 to the ground. The energization of the relay coil AS$_a$ will effect the closure of contacts AS$_a$1—6 (Fig. 2h), AS$_a$7—9 (Fig. 2a) and AS$_a$10—15 (Fig. 2e).

In the problem taken, the first significant digit in the quotient and remainder amounts happens to be whole numbers and not decimals and accordingly the units digit "4" of the dividend amount is entered in the units order of the SP accumulator. However, if the quotient or dividend amount had been a decimal, at the hundredths order, that is the quotient as 000000.17000 or remainder as —000000.31000 there would be three zeros to the right of the first significant digit. Thus the unit of the dividend amount will be shifted two positions to the left and will be entered into the hundreds order of the SP accumulator.

It is for this reason the particular relay AS$_a$—AS$_t$ energized is dependent upon the N2 and TT2 contacts closed and their interaction determines the particular AS relay to be energized and the necessary denominational shift in the SP accumulator.

The above described presensing operations take place during the second machine cycle as is indicated in the timing diagram of Fig. 12. During the next machine cycle or the third machine cycle from the start, the sensing brushes 308 sense the quotient, remainder, dividend and divisor values and these values are entered in the accumulators in a manner now to be described in detail.

Referring to Fig. 13, it will be observed that certain plug connections are made between the plug hubs 309 connected to the analyzing brushes 308 and other plug hubs to be mentioned as the description progresses.

Suitable plug connections are made between the plug hubs 309 associated with the quotient representing card field and the plug hubs 503. The entering circuit for entering the quotient amount in the ML accumulators is as follows: Line 301 (Fig. 2c), through contacts G1, through cam contacts FC6, through the circuit breaker 306, through the contact roll 307, brushes 308, plug hubs 309 and then by the plug connections just described to the plug hubs 503 (Fig. 2a), then through the closed contacts AS$_a$7—9 now closed, through the 313ML1—2 accumulator, and also through the K1—12 contacts through the 313ML3—6, 313ML4—8, 313ML5, 313ML7 and the 313ML9 accumulators. In accordance with the closure of the contacts AS$_a$7—9, the entry will be made in such accumulators with the first significant digit entered in the units order of these accumulators. Thereafter multiples of the quotient are built up in a manner explained for regular multiplying operations.

To effect the entry of the remainder, plug connections are made from the plug hubs 309 (Fig. 13) related to the remainder value representing card field to the plug hubs 501 (Fig. 2h). These values are analyzed by the brushes 308 and by the plug connections between the plug hubs 309 (Fig. 2) to the plug hubs 501 (Fig. 2h). The impulses representing the digit are transmitted through the AS<sub>a</sub>1—6 contacts now closed, and by lines which extend across Fig. 2h and upwardly from this figure to Fig. 2g, the impulses are directed to 313RD accumulator magnets. Thus, the remainder amount will be entered in the RD accumulator in proper shifted relation to correspond with the shifted relationship of the quotient or dividend amount.

The dividend amount analyzed by the brushes 308 is entered in the SP accumulator by effecting plug connections between the plug hubs 309 of the dividend representing field (see Fig. 13) to the plug hubs 502. The plug hubs 502 are shown in Fig. 2e. The impulses representative of the digits of the dividend are transmitted through contacts AS<sub>a</sub>10—15 to the 313SP accumulator magnets. This will effect the entry of the dividend amount into the SP accumulator in proper position with respect to the shift required by the quotient and remainder amount.

The divisor is entered in the MP accumulator as follows: From Fig. 13 it will be observed that plug connections are made between the plug hubs 309 related to the divisor represented field and the plug hubs 310. Plug hubs 310 are shown in Fig. 2e and impulses representative of the divisor amount are transmitted through contacts MP1—3 now closed to the 313MP accumulator magnets.

During the fourth and fifth machine cycles there is a building up of the multiples into the various ML readouts which is a prerequisite to multiplying operations.

In the manner previously described, contacts B2 and D2 (Fig. 2e) will be closed and a circuit will be closed as follows: Line 301, through cam contacts CC27, through the AK1 contacts in the position shown in Fig. 2e to contacts B2, thence through contacts D2, through contacts HH2, through AG3 (now transferred) through the relay 321PQ to ground. The energization of 321PQ closes its stick contacts PQ2, setting up a stick circuit for itself back through cam contacts CC5 to line 301.

The energization of 321PQ closes contacts PQ10 and PQ4—9, both of which are shown in Fig. 2f. This will cause the reset of the accumulator PQ in the fifth machine cycle as is indicated in the diagram of Fig. 12. The resetting of the PQ accumulator is effected in the manner previously described, that is, by the emitter 511 complementary impulses are directed under control of the readout PQR through contacts PQ4—9 now closed, to accumulator magnets 313PQ. This will clear the PQ accumulator of any amount previously entered therein so as to condition it to receive the subproducts of the subsequent multiplying operation and other values entered therein which are to be pointed out in detail as the specification progresses.

Referring to Fig. 2d at the right thereof, the closure of contacts PQ1 effected by the energization of 321PQ will close a circuit from the ground through AL2 contacts (now transferred) through PQ1 now closed, through cam contacts CC7, through H5 contacts, through JJ relay coil to line 301. The energization of the JJ relay closes its stick contacts to set up a stick circuit for itself back through JJ1 contacts and ML29 contacts to ground. In the manner previously described in connection with regular multiplying operations, the energization of the JJ relay initiates multiplying operations and such operations will be effected in the sixth machine cycle in the problem assumed. Referring to Fig. 10, the various subproducts derived are entered in the PQ accumulator and since in the problem outlined the multiplicand amount is "17" the four and nine multiples thereof will be entered in the PQ accumulator in the proper denominational orders according to the necessary column shift. This accumulator will thereby have formed therein the product and to this product there is added the remainder amount which in the problem adopted is —31.

During the seventh machine cycle, the machine will cause the reset of the ML accumulators and the MP accumulator and this is effected in the manner previously described for regular multiplying operations. During this same machine cycle there is a transfer of the remainder amount which was entered in the RD accumulator to the PQ accumulator and is effected by a circuit described as follows: From line 301 through contact RD12 in the position shown in Fig. 2g, through the emitter 348 so that impulses are directed under control of the RDR readout and sent through RD4—9 contacts now closed, through contacts CA1—5 now closed, through AL3—8 contacts now transferred and through impulse transmitting lines 1920 extending to Fig. 2f and thence to 313PQ accumulator magnets to ground. This will effect the transfer of the remainder as a positive number to the PQ accumulator and as outlined in Fig. 12, this will be performed in the seventh machine cycle.

During the following cycle of operation which is the eighth machine cycle in the problem adopted, the resetting of the RD accumulator is effected and this is carried out in the same manner as was explained in connection with regular multiplying operations. Referring now to Fig. 2d, at the left side of the figure, it will be seen that the RD magnet will close relay contacts RD1, thereby closing a circuit from the ground through cam contacts CC20, through RD1 contacts now closed, through the E relay coil to line 301. The E relay will close its contacts E2, thereby completing a circuit from the ground through CC29 contacts, through punch contacts P1 now closed, through E2 contacts now closed, through the JJ2 contacts, through the stop key contacts 303 and to card feed clutch magnet 304, through D1 contacts now closed to the line 301. This will cause the energization of the card feed clutch magnet, which is also shown in Fig. 1a, thereby initiating card feed operations to thus feed the next card to be checked into the presensing position and thereafter machine operations will take place as has been previously described in detail. During the same cycle of operation, there is a transfer of the tens complement of the amount standing on the SP accumulator to the PQ accumulator and subsequently the SP accumulator is reset to zero. For resetting the RD accumulator, it will be recalled that the energizing circuit for 321RD is through cam contacts CC27 (Fig. 2f) through AK1 contacts then down through the Y1 contacts through AK30 contacts to 321RD. From the Y1 contacts there is a branch circuit through the AG2 contacts to the 321SP relay coil to the ground. A stick circuit is set up for the SP relay coil through SP8 contacts, through CC5 contacts to line 301. The energization of the 321SP relay coil causes the closure of certain relay contacts which will now be referred to. For transferring the complement of the amount standing on the SPR readout to the PQ accumulator, a circuit is closed from the line 301 (Fig. 2f) through the complemental impulse distributor 375, through the SPR readout, through relay contacts SP10—15 now closed, thence through the 313PQ accumulator magnets to ground. This will cause the transfer of the nines complement on the SP accumulator to the PQ accumulator. Impulses sent under control of the SPR readout go through contacts SP1—6 now closed, and by lines 1915 extending to Fig. 2e, through 313SP accumulator magnets to the ground. With respect to the SP accumulator, the elusive "1" is entered in the accumulator magnet from the unit digit impulse transmitting line 324 (Fig. 2e) through contacts SP16 now closed thence through contacts AV32 to the units order accumulator magnet 313SP. The amount entered in the SP accumulator will now be the tens complement, thereby restoring it to zero.

The desired elusive "1" is entered in the PQ accumulator from the unit digit impulse transmitting wire 324 through contacts SP7 and AV36 to the units order accumulator magnet 313PQ. The latter has now received the tens complement of the amount standing on the SP accumulator which operation is outlined in Fig. 10 for the problem adopted. It will be apparent from the mathematics involved that since the quotient has been multiplied by the divisor and the remainder has been added to the product obtained, the subtraction of the dividend amount should bring the PQ accumulator to zero if the mathematical relationship between such factors and results is true. The determination of this is effected by testing the PQ accumulator to determine whether it is now at zero and is effected by the following described means.

Referring to Fig. 2d, upon the closure of contacts CC39, a circuit will be extended through RD2 contacts now closed, through AK12 contacts in the position shown, through AL1 contacts (now transferred), through the AM relay coil, to line 301. The energization of AM relay coil, referring to Fig. 2h will cause a closure of relay contacts AM1. If the PQR' readout has been brought to a zero representation, a circuit will be completed from the ground through AM1 contact and by means of the brushes of the PQR' readout now standing at zero, the circuit will be extended to the AG6 contacts (now transferred), and thence by line 570 (Fig. 2h and Fig. 2d) through the punch contact 358, through contacts AL9 (now transferred) to the punch magnet 360. A branch circuit is also established from the line 570 through the A relay coil to the line 301.

The punching mechanism adapted to be utilized in connection with the present machine is well known in the art and is shown in considerable detail in the patent to G. F. Daly, No. 2,045,437, dated June 23, 1936, and the magnet 360 in the present machine corresponds to the punch magnet identified by number 409 in the aforementioned patent. Contacts 358 hereinbefore referred to correspond to contacts identified by numeral 215 in Fig. 5 of the patent. As is well known in the type of punching machine referred to, the operation of the punch magnet 360 will cause the punch carriage to escape one column and concurrently open contacts 358. Thereafter there is a successive column by column escapement of the punch carriage by means of an "auto spacing" circuit which is well known in the form of punching machine referred to. This column by column escapement of the carriage will cause the successive columns of the card representing the values on the card to pass by the punching instrumentalities without any punching operations being effected. When all of the value representing fields have passed by the punches, the well known "high bar" will cause the skipping of the carriage to the last column position to close P5 contacts (Fig. 2d).

However, if it had been determined that the mathematical relationship between the factors and results on the card was not correct, one of the brushes of the PQR' readout would not be at zero so that when AM1 contacts closed the circuit would be closed from the ground, through such contacts, and thence by one of the brushes which was not standing at zero through the AR relay coil, to the line 301. The energization of the AR relay coil causes the AR1 contact to close and set up a stick circuit for itself. The punching machine carriage will not space due to the fact that no impulse is sent over the line 570 to the A relay coil and punch magnet 360.

The conditioning of the machine to again start it into a subsequent checking operation is effected by the depression of the reset key 571 (Fig. 2e) and by the circuit from line 301, cam contacts CC27, AK1 contacts at normal, switch 571, AR3 contacts now closed, 321PQ magnet, the PQ accumulator will now be reset to zero. Also as previously described the energization of 321PQ will cause the closure of PQ11 contacts (Fig. 2h) which will then complete the closing of the circuit by the line 570 through the punch magnet 360 and the A relay coil. The punch carriage will now be spaced column by column and then it will be escaped to its last column position. In the last column position of the card rack or carriage P5 contacts (Fig. 2d) close to energize B relay coil. B relay closes B1 and B2. B1 causes card ejection magnet 361 to energize. During reset of RD, RD1 closed to energize relay coil E to initiate a card feed cycle, as previously stated. This card was fed past brushes 308 down to the punch feed bed to close 317 contacts which energized relay coil D to transfer D1 and close D2 (Fig. 2e). The machine then waits until the card which is already in the machine for the previous operation has been ejected after which a PQ accumulator reset takes place due to closure of B2 and D2 as previously described and a new checking operation is initiated.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a checking machine for checking the mathematical relationship expressed by designations on records, each record representing a dividend and a divisor amount and related quotient and remainder amounts derived by previous dividing operations, the combination of a quotient receiving means, a remainder receiving means, a divisor receiving means, a dividend receiving means, separate means to concurrently analyze the designations representing all of said amounts in one analyzing cycle and respective separate means to enter in the same cycle said quotient in said quotient receiving means, said remainder amount in said remainder receiving means, said dividend in said dividend receiving means and said divisor in said divisor receiving means, a product receiving means, multiplying means under control of said quotient receiving means and said divisor receiving means for effecting the multiplication of the amounts represented thereby in one or more multiplying cycles and for entering the computed product in said product receiving means, means for transferring the amount in said remainder receiving means into said product receiving means in a cycle subsequent to multiplying cycles of operation, means to thereafter transfer the complement of the amount in said dividend receiving means into said product receiving means in a cycle of operation subsequent to the completion of the first transfer cycle, the result of both of said transferring operations diminishing the product previously entered to zero, means cooperatively related to said product receiving means to test the zero condition thereof, and means to effect the operation of said testing means in the same cycle of operation the complement of the dividend amount is transferred.

2. In a checking machine for checking the mathematical relationship expressed by designations on a record representing a dividend, a divisor, a remainder and a quotient, the last two amounts having been calculated by a previous dividing operation and denominated in their recording on the record according to the denominational magnitudes of the dividend and divisor and also according to the number of quotient digits previously determined and secured by the previous dividing operation, record controlled entry means for the four amounts, record controlled entry receiving means for the four amounts controlled by said entry means, means for multiplying the divisor and quotient amounts controlled by the respective receiving means therefor including means for receiving and setting up the product thereof, separate means for sensing the quotient and remainder amounts for detecting the denominational magnitude of the decimal portion of such amounts, a plurality of selectively operated entry shift control means, means controlled conjointly by the aforesaid sensing means to select said entry shift control means for operation in accordance with the denominational size of the decimal portion of the quotient and remainder amounts, said entry means for the dividend amount including denominational entry routing means selectively operated in accordance with the selected entry shift control means operated for routing the dividend amount into selected orders of the dividend receiving means, complement transfer means for transferring the dividend amount routed in the dividend receiving means to the product receiving means, said complement entry means bringing said product receiving means to a similar digit representation in all orders thereof after the summation of the remainder amount in said product receiving means, said entry means for the remainder amount including other denominational entry routing means selectively operated in accordance with the selected entry shift control means operated for causing said remainder amount to be routed to selected orders of the remainder receiving means, other transfer means to transfer the amount from said remainder amount receiving means to said product receiving means, and means to test said product receiving means after the complement transfer and the transfer of the remainder amount to determine whether all orders thereof are at the same digit representing position.

JAMES W. BRYCE.